United States Patent
Kajiyama et al.

(10) Patent No.: US 12,081,112 B2
(45) Date of Patent: Sep. 3, 2024

(54) POWER CONVERSION DEVICE

(71) Applicant: Mitsubishi Electric Corporation, Tokyo (JP)

(72) Inventors: Takuya Kajiyama, Tokyo (JP); Toshiyuki Fujii, Tokyo (JP); Shuhei Fujiwara, Tokyo (JP); Ryosuke Uda, Tokyo (JP); Shigeo Hayashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 276 days.

(21) Appl. No.: 17/785,596

(22) PCT Filed: Dec. 25, 2019

(86) PCT No.: PCT/JP2019/050873
§ 371 (c)(1),
(2) Date: Jun. 15, 2022

(87) PCT Pub. No.: WO2021/130911
PCT Pub. Date: Jul. 1, 2021

(65) Prior Publication Data
US 2023/0018083 A1    Jan. 19, 2023

(51) Int. Cl.
*H02M 1/12* (2006.01)
*H02M 1/00* (2006.01)
(Continued)

(52) U.S. Cl.
CPC ........... *H02M 1/12* (2013.01); *H02M 1/0025* (2021.05); *H02M 1/325* (2021.05);
(Continued)

(58) Field of Classification Search
CPC .... H02M 1/0009; H02M 1/0025; H02M 1/12; H02M 1/123; H02M 1/32; H02M 1/325;
(Continued)

(56) References Cited

U.S. PATENT DOCUMENTS

2014/0016379 A1*  1/2014  Yamamoto ............. H02M 5/44
                                                                363/37
2017/0250621 A1*  8/2017  Townsend ............. H02M 1/084
(Continued)

FOREIGN PATENT DOCUMENTS

EP    2685621 A2   1/2014
JP    S5886874 A   5/1983
(Continued)

OTHER PUBLICATIONS

Extended European Search Report issued in corresponding European Application No. 19957833.7, mailed on Nov. 30, 2022, 7 pages.
(Continued)

*Primary Examiner* — Thienvu V Tran
*Assistant Examiner* — Shahzeb K Ahmad
(74) *Attorney, Agent, or Firm* — Buchanan Ingersoll & Rooney PC

(57) ABSTRACT

A power converter includes at least one arm having a plurality of converter cells cascaded to each other. Each of the converter cells includes a pair of input/output terminals, a plurality of switching elements, and a power storage element. The power storage element is electrically connected to the input/output terminals through the switching elements. A control device generates a control signal for controlling on and off of the switching elements of each converter cell. The control device generates the control signal by pulse width modulation control based on a modulation command signal including an AC component having a fundamental frequency and corresponding to a command value of an output voltage between the input/output terminals, in each converter cell, such that a harmonic component included in the output voltage and having a predetermined (Continued)

frequency that is an integer multiple of the fundamental frequency is suppressed.

18 Claims, 16 Drawing Sheets

(51) Int. Cl.
    *H02M 1/32*     (2007.01)
    *H02M 7/483*     (2007.01)
    *H02M 7/5395*     (2006.01)

(52) U.S. Cl.
    CPC ....... *H02M 7/4833* (2021.05); *H02M 7/4835* (2021.05); *H02M 7/5395* (2013.01)

(58) Field of Classification Search
    CPC .. H02M 7/483; H02M 7/4833; H02M 7/4835; H02M 7/49; H02M 7/53873; H02M 7/5395
    See application file for complete search history.

(56) References Cited

U.S. PATENT DOCUMENTS

| | | | |
|---|---|---|---|
| 2018/0241321 A1* | 8/2018 | Whitehouse | H02M 1/0095 |
| 2018/0287509 A1* | 10/2018 | Fujii | H02M 7/483 |
| 2020/0274462 A1* | 8/2020 | Schiedermeier | H02M 5/453 |
| 2022/0029524 A1 | 1/2022 | Kajiyama et al. | |

FOREIGN PATENT DOCUMENTS

| | | | | |
|---|---|---|---|---|
| JP | 5775033 B2 | 9/2015 | | |
| JP | 6377310 B1 * | 8/2018 | | H02M 7/483 |
| JP | 6545425 B1 | 7/2019 | | |

OTHER PUBLICATIONS

Holmes, et al., "Pulse Width Modulation For Power Converters: Principles and Practice", Wiley-IEEE Press, Oct. 2003, p. 396-411.

Norrga, et al., "Decoupled Steady-State Model of The Modular Multilevel Converter With Half-Bridge Cells", Proc. of 6th IET International Conference on Power Electronics, Machines and Drives (PEMD 2012), Mar. 2012, 6 pages.

International Search Report (PCT/ISA/210) with translation and Written Opinion (PCT/ISA/237) mailed on Mar. 31, 2020, by the Japan Patent Office as the International Searching Authority for International Application No. PCT/JP2019/050873. (8 pages).

\* cited by examiner (a)  (b)

FIG.9
(a) fc/f1=3.5
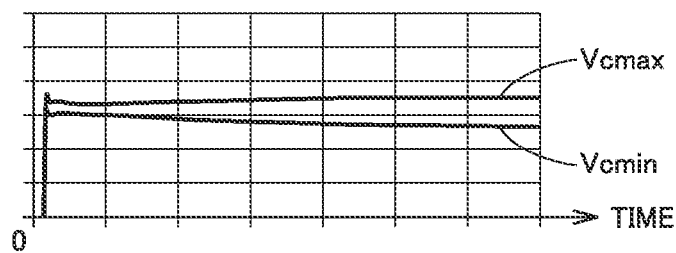
(b) fc/f1=3.375
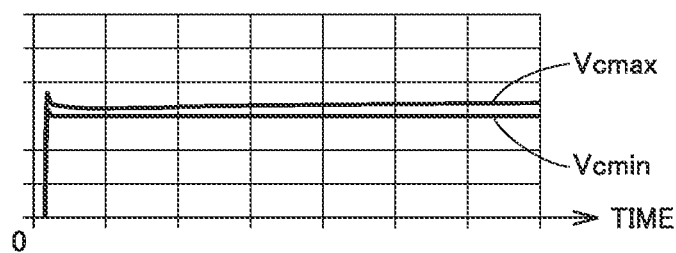

POWER CONVERSION DEVICE

TECHNICAL FIELD

The present disclosure relates to a power conversion device.

BACKGROUND ART

Modular multilevel converters (MMCs) including a plurality of unit converters (hereinafter referred to as "converter cells") connected in cascade are known. MMCs can be easily adapted for high voltage by increasing or decreasing the number of converter cells connected in cascade and thus can be applied as AC/DC power converters for static synchronous compensators (STATCOM) and high voltage direct current (HVDC) transmission in a wide variety of transmission and distribution networks.

Converter cells include a plurality of switches (hereinafter also referred to as switching elements) and power storage elements and are known to have a variety of circuit configurations such as chopper circuits and bridge circuits.

For control of MMCs, pulse width modulation (PWM) control is often used. PWM control is a kind of modulation schemes for modulating a modulation command signal represented by an alternating-current waveform into a pulsed signal. The on/off of switching elements in a converter cell is controlled in accordance with the pulsed signal, so that the output of the converter cell can be controlled in accordance with the modulation command signal. The output includes a frequency component of a modulation signal as well as a switching frequency component by PWM control.

Japanese Patent No. 5775033 (PTL 1) and NPL 1 describe PWM control based on comparison between a carrier signal and a modulation signal, in which the frequency of the carrier signal, that is, the on/off frequency (switching frequency) for switching elements is set to 3.5 times higher the frequency of an output AC voltage.

Specifically, PTL 1 discloses that the ratio of the switching frequency to the output AC voltage frequency, that is, the number of carrier signals (the number of carriers) in one cycle of the modulation signal is set to 3.5 (or a number that is half an integer), whereby the DC component of current flowing through a capacitor (power storage element) is reduced, thereby suppressing circulating current for preventing the capacitor voltage from keeping increasing or decreasing.

Another variation of PWM control is disclosed in, for example, Japanese Patent Laying-Open No. 58-86874, which describes a modulation method different from the PWM control using carrier signals. In this modulation method, a pulsed signal selected to eliminate a harmonic component of a certain order is directly generated (hereinafter also referred to as "certain low-order harmonic cancellation-type pulse pattern method"). In the certain low-order harmonic cancellation-type pulse pattern method, a pulse pattern is generated in each pattern cycle, based on a modulation command signal.

CITATION LIST

Patent Literature

PTL 1: Japanese Patent No. 5775033
PTL 2: Japanese Patent Laying-Open No. 58-86874

Non Patent Literature

NPL 1: S. Norrga, et. al., "Decoupled Steady-State Model of The Modular Multilevel Converter With Half-Bridge Cells", Proc of 6th IET International Conference on Power Electronics, Machines and Drives (PEMD 2012), March 2012

SUMMARY OF INVENTION

Technical Problem

Unfortunately, as described in PTL 1 and NPL 1, when the switching frequency is set to 3.5 times higher than the output AC voltage frequency, the harmonic components resulting from the switching match the frequency of the output AC voltage or the harmonic frequencies at multiples of 5, 7, 11, and 13, typically originating from the converter, to cause charge/discharge of capacitors due to the switching harmonic components. As a result of such charge and discharge, an energy imbalance among converter cells in an arm may increase, leading to an imbalance in voltage of power storage elements (capacitors) among converter cells.

If the imbalance in capacitor voltage becomes too excessive, the output waveform of the MMC is distorted. Moreover, the capacitor voltage may become excessive or deficit, causing a protective halt of the MMC. Furthermore, the capacitor voltage may deviate from a design value in a certain converter cell, causing an adverse effect on the life of the converter cell. It is therefore necessary to suppress the imbalance in capacitor voltage, but unfortunately, circulating current for this increases.

The present disclosure is made to solve such a problem and an object of the present disclosure is to suppress an imbalance of power storage element voltage among converter cells by appropriate PWM control.

Solution to Problem

According to an aspect of the present disclosure, a power conversion device includes a power converter including at least one arm having a plurality of converter cells cascaded to each, and a control device to control the power converter. Each of the converter cells includes a pair of input/output terminals, a plurality of switching elements, and a power storage element. The power storage element is electrically connected to the input/output terminals through the switching elements. The control device includes an individual cell controller to generate a control signal for controlling on and off of the switching elements of each of the converter cells. The individual cell controller generates the control signal by pulse width modulation control based on a modulation command signal corresponding to a command value of an output voltage between the input/output terminals, in each converter cell, such that a harmonic component included in the output voltage and having a predetermined frequency is suppressed. The modulation command signal includes an AC component having a predetermined first frequency.

Advantageous Effects of Invention

According to the present disclosure, pulse width modulation control is performed such that an on/off control signal for a plurality of switching elements in each converter cell is generated such that a harmonic component having a predetermined frequency is suppressed, so that inflow or outflow of energy of the converter cell at the frequency of the harmonic is suppressed and an imbalance of power storage element voltage among converter cells is suppressed.

BRIEF DESCRIPTION OF DRAWINGS

FIG. 9 is a graph showing the simulation result of the imbalance made in capacitor voltage in the same arm for different carrier frequencies.

DESCRIPTION OF EMBODIMENTS

Figure 1:
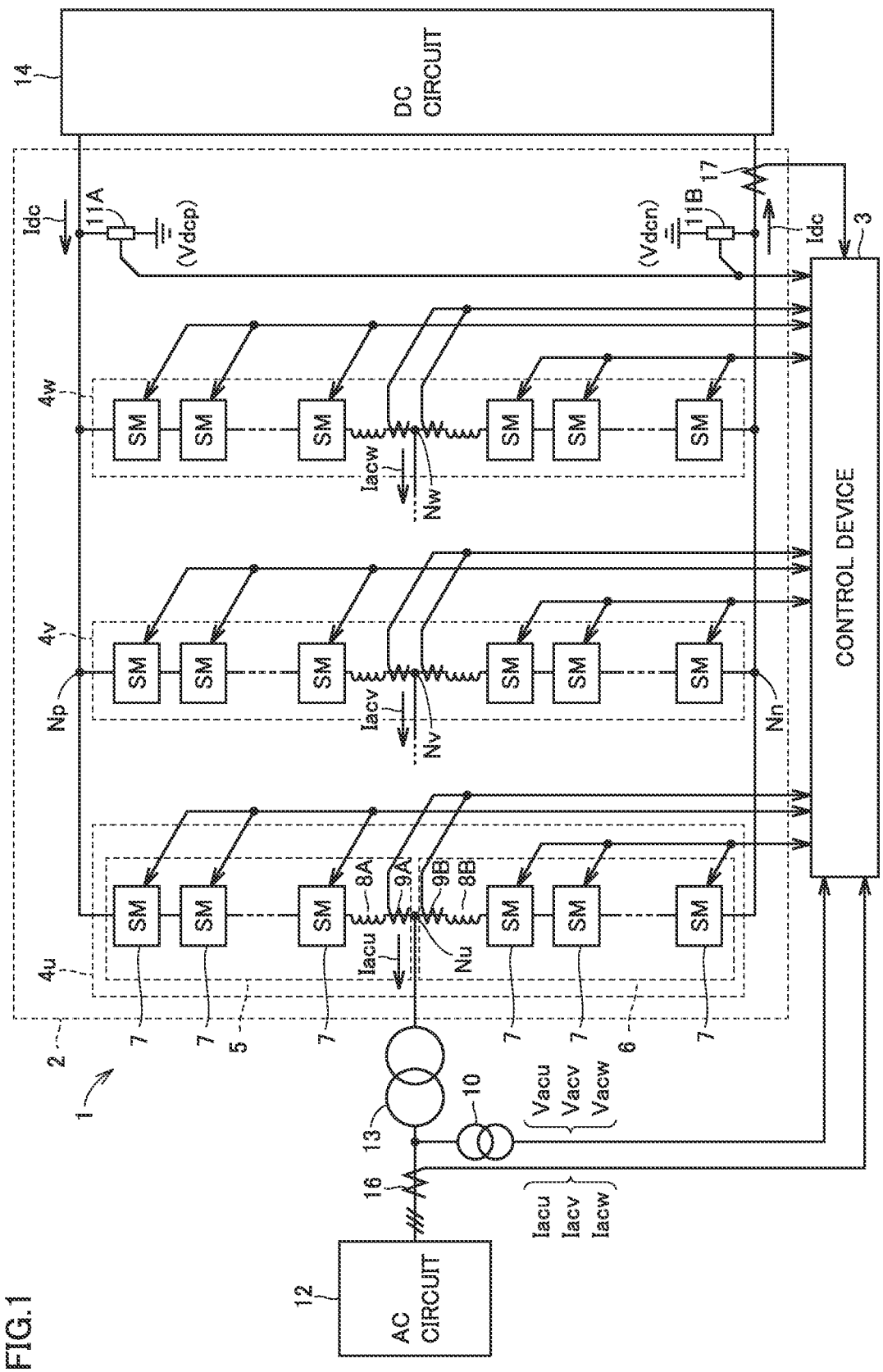
FIG. 1 is a schematic configuration diagram of a power conversion device according to the present embodiment.

Embodiments of the present disclosure will be described in detail below with reference to the drawings. In the following, like or corresponding parts in the drawings are denoted by like reference signs and a description thereof is basically not repeated.

First Embodiment (Overall Configuration of Power Conversion Device)

FIG. 1 is a schematic configuration diagram of a power conversion device 1 according to the present embodiment.

Referring to FIG. 1, power conversion device 1 is configured with a modular multilevel converter (MMC) including a plurality of converter cells connected in series to each other. The "converter cell" may be referred to as "submodule", SM", or "unit converter". Power conversion device 1 performs power conversion between a DC circuit 14 and an AC circuit 12. Power conversion device 1 includes a power converter 2 and a control device 3.

Power converter 2 includes a plurality of leg circuits 4u, 4v, and 4w (denoted as leg circuit 4 when they are collectively referred to or any one of them is referred to) connected in parallel with each other between a positive DC terminal (that is, high potential-side DC terminal) Np and a negative DC terminal (that is, low potential-side DC terminal) Nn.

Leg circuit 4 is provided for each of a plurality of phases forming alternating current. Leg circuit 4 is connected between AC circuit 12 and DC circuit 14 to perform power conversion between those circuits. In FIG. 1, AC circuit 12 is a three-phase alternating current system, and three leg circuits 4u, 4v, and 4w are provided respectively corresponding to U phase, V phase, and W phase.

AC input terminals Nu, Nv, and Nw respectively provided for leg circuits 4u, 4v, and 4w are connected to AC circuit 12 through a transformer 13. AC circuit 12 is, for example, an AC power system including an AC power source. In FIG. 1, for simplification of illustration, the connection between AC input terminals Nv, Nw and transformer 13 is not shown.

High potential-side DC terminal Np and low potential-side DC terminal Nn connected in common to leg circuits 4 are connected to DC circuit 14. DC circuit 14 is, for example, a DC power system including a DC power transmission network or a DC terminal of another power conversion device. In the latter case, two power conversion devices are coupled to form a back to back (BTB) system for connecting AC power systems having different rated frequencies.

AC circuit 12 may be connected through an interconnecting reactor, instead of using transformer 13 in FIG. 1. Furthermore, instead of AC input terminals Nu, Nv, and Nw, leg circuits 4u, 4v, and 4w may be provided with respective primary windings, and leg circuits 4u, 4v, and 4w may be connected in terms of alternating current to transformer 13 or the interconnecting reactor through secondary windings magnetically coupled to the primary windings. In this case, the primary windings may be reactors 8A and 8B described below. Specifically, leg circuits 4 are electrically (that is, in terms of direct current or alternating current) connected to AC circuit 12 through connections provided for leg circuits 4u, 4v, and 4w, such as AC input terminals Nu, Nv, and Nw or the primary windings.

Leg circuit 4u includes an upper arm 5 from high potential-side DC terminal Np to AC input terminal Nu and a lower arm 6 from low potential-side DC terminal Nn to AC input terminal Nu. AC input terminal Nu that is a connection point between upper arm 5 and lower arm 6 is connected to transformer 13. High potential-side DC terminal Np and low potential-side DC terminal Nn are connected to DC circuit 14. Leg circuits 4v and 4w have a similar configuration, and hereinafter the configuration of leg circuit 4u is explained as a representative example.

Upper arm 5 includes a plurality of converter cells 7 connected in cascade and a reactor 8A. Converter cells 7 and reactor 8A are connected in series. Similarly, lower arm 6 includes a plurality of converter cells 7 connected in cascade and a reactor 8B. Converter cells 7 and reactor 8B are connected in series. In the following description, the number of converter cells 7 included in each of upper arm 5 and lower arm 6 is denoted as Ncell. Ncell is ≥2.

Reactor 8A may be inserted at any position in upper arm 5 of leg circuit 4u, and reactor 8B may be inserted at any position in lower arm 6 of leg circuit 4u. A plurality of reactors 8A and a plurality of reactors 8B may be provided.

The inductances of the reactors may be different from each other. Only reactor 8A of upper arm 5 or only reactor 8B of lower arm 6 may be provided. The provision of reactors 8A and 8B can suppress abrupt increase of accident current at a time of an accident in AC circuit 12 or DC circuit 14.

Power conversion device 1 further includes an AC voltage detector 10, an AC current detector 16, DC voltage detectors 11A and 11B, and arm current detectors 9A and 9B provided for each leg circuit 4, as detectors for measuring the quantity of electricity (current, voltage, etc.) used in control. Signals detected by these detectors are input to control device 3.

In FIG. 1, the signal lines of signals input from the detectors to control device 3 and the signal lines of signals input and output between control device 3 and converter cells 7 are depicted partially collectively for the sake of ease of illustration, but, in actuality, they are provided individually for each detector and each converter cell 7. Signal lines between each converter cell 7 and control device 3 may be provided separately for transmission and reception. The signal lines are formed with, for example, optical fibers.

The detectors will now be specifically described.

AC voltage detector 10 detects U-phase AC voltage Vacu, V-phase AC voltage Vacv, and W-phase AC voltage Vacw of AC circuit 12. In the following description, Vacu, Vacv, and Vacw may be collectively referred to as Vac.

AC current detector 16 detects U-phase AC current Iacu, V-phase AC current Iacv, and W-phase AC current Iacw of AC circuit 12. In the following description, Iacu, Iacv, and Iacw may be collectively referred to as Iac.

DC voltage detector 11A detects DC voltage Vdcp at high potential-side DC terminal Np connected to DC circuit 14. DC voltage detector 11B detects DC voltage Vdcn at low potential-side DC terminal Nn connected to DC circuit 14. The difference between DC voltage Vdcp and DC voltage Vdcn is defined as DC voltage Vdc. DC voltage detector 17 detects DC current Idc flowing through high potential-side DC terminal Np or low potential-side DC terminal Nn.

Arm current detectors 9A and 9B provided in leg circuit 4u for U phase respectively detect upper arm current Ipu flowing through upper arm 5 and lower arm current Inu flowing through lower arm 6. Arm current detectors 9A and 9B provided in leg circuit 4v for V phase respectively detect upper arm current Ipv and lower arm current Inv. Arm current detectors 9A and 9B provided in leg circuit 4w for W phase respectively detect upper arm current Ipw and lower arm current Inw. In the following description, upper arm currents Ipu, Ipv, and Ipw may be collectively referred to as upper arm current Iarmp, lower arm currents Inu, Inv, and Inw may be collectively referred to as lower arm current Iarmn, and upper arm current Iarmp and lower arm current Iarmn may be collectively referred to as Iarm.

(Configuration Example of Converter Cell)

Figure 2:
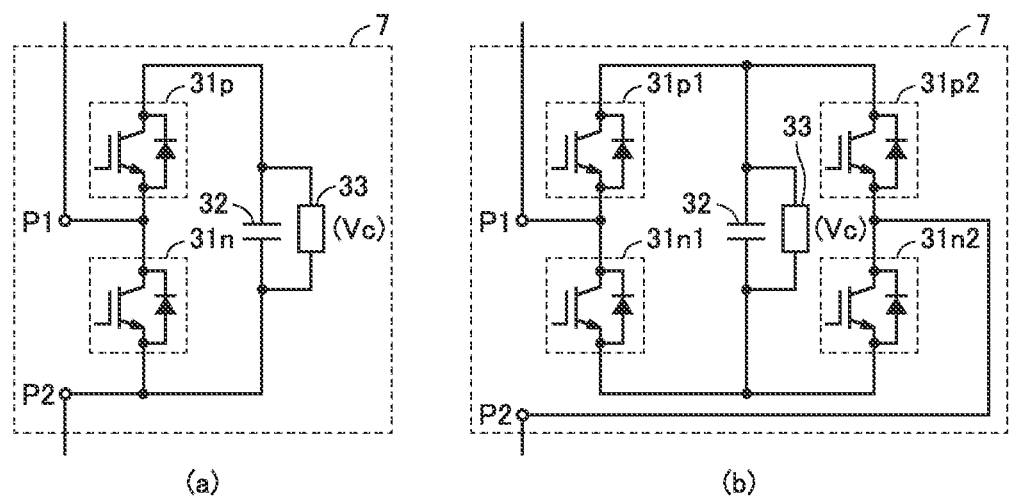
FIG. 2 is a circuit diagram illustrating a configuration example of a converter cell that constitutes a power converter shown in FIG. 1.

FIG. 2(a) and FIG. 2(b) are circuit diagrams showing a configuration example of converter cell 7 that constitutes power converter 2.

Converter cell 7 shown in FIG. 2(a) has a circuit configuration called half bridge configuration. This converter cell 7 includes a series of two switching elements 31p and 31n connected in series, a power storage element 32, a voltage detector 33, and input/output terminals P1 and P2. The series of switching elements 31p and 31n and power storage element 32 are connected in parallel. Voltage detector 33 detects voltage Vc between both ends of power storage element 32.

Both terminals of switching element 31n are connected to input/output terminals P1 and P2. With switching operation of switching elements 31p and 31n, converter cell 7 outputs voltage Vc of power storage element 32 or zero voltage between input/output terminals P1 and P2. When switching element 31p is turned ON and switching element 31n is turned OFF, voltage Vc of power storage element 32 is output from converter cell 7. When switching element 31p is turned OFF and switching element 31n is turned ON, converter cell 7 outputs zero voltage.

Converter cell 7 shown in FIG. 2(b) has a circuit configuration called full bridge configuration. This converter cell 7 includes a first series of two switching elements 31p1 and 31n1 connected in series, a second series of two switching elements 31p2 and 31n2 connected in series, a power storage element 32, a voltage detector 33, and input/output terminals P1 and P2. The first series, the second series, and power storage element 32 are connected in parallel. Voltage detector 33 detects voltage Vc between both ends of power storage element 32.

The middle point of switching element 31p1 and switching element 31n1 is connected to input/output terminal P1. Similarly, the middle point of switching element 31p2 and switching element 31n2 is connected to input/output terminal P2. With switching operation of switching elements 31p1, 31n1, 31p2, and 31n2, converter cell 7 outputs voltage Vc, −Vc of power storage element 32 or zero voltage between input/output terminals P1 and P2.

In FIG. 2(a) and FIG. 2(b), switching elements 31p, 31n, 31p1, 31n1, 31p2, and 31n2 are configured, for example, such that a freewheeling diode (FWD) is connected in anti-parallel with a self-turn-off semiconductor switching element such as an insulated gate bipolar transistor (IGBT) or a gate commutated turn-off (GCT) thyristor.

In FIG. 2(a) and FIG. 2(b), a capacitor such as a film capacitor is mainly used for power storage element 32. Power storage element 32 may hereinafter be called capacitor. In the following, voltage Vc of power storage element 32 may be referred to as capacitor voltage Vc.

As shown in FIG. 1, converter cells 7 are connected in cascade. In each of FIG. 2(a) and FIG. 2(b), in converter cell 7 arranged in upper arm 5, input/output terminal P1 is connected to input/output terminal P2 of adjacent converter cell 7 or high potential-side DC terminal Np, and input/output terminal P2 is connected to input/output terminal P1 of adjacent converter cell 7 or AC input terminal Nu, Nv, Nw. Similarly, in converter cell 7 arranged in lower arm 6, input/output terminal P1 is connected to input/output terminal P2 of adjacent converter cell 7 or AC input terminal Nu, Nv, Nw, and input/output terminal P2 is connected to input/output terminal P1 of adjacent converter cell 7 or low potential-side DC terminal Nn.

In the following, converter cell 7 has the half bridge cell configuration shown in FIG. 2(a), and a semiconductor switching element is used as a switching element, and a capacitor is used as a power storage element, by way of example. However, converter cell 7 that constitutes power converter 2 may have the full bridge configuration shown in FIG. 2(b). A converter cell having a configuration other than those illustrated in the examples above, for example, a converter cell having a circuit configuration called clamped double cell may be used, and the switching element and the power storage element are also not limited to the examples above.

(Control Device)

Figure 3:
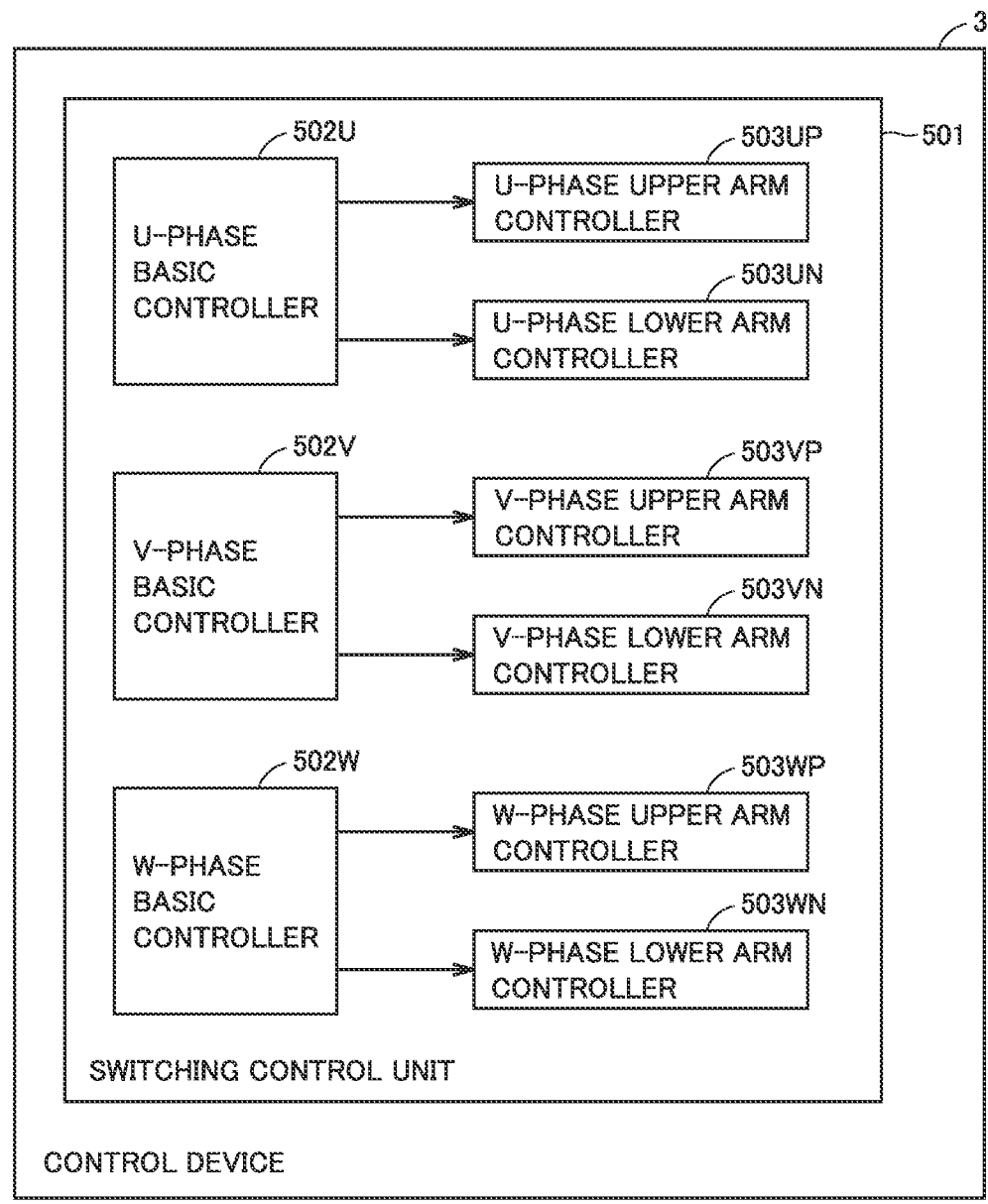
FIG. 3 is a functional block diagram illustrating an internal configuration of a control device shown in FIG. 1.

FIG. 3 is a functional block diagram illustrating an internal configuration of control device 3 shown in FIG. 1.

Referring to FIG. 3, control device 3 includes a switching control unit 501 for controlling ON and OFF of switching elements 31p and 31n of each converter cell 7.

Switching control unit 501 includes a U-phase basic controller 502U, a U-phase upper arm controller 503UP, a U-phase lower arm controller 503UN, a V-phase basic controller 502V, a V-phase upper arm controller 503VP, a V-phase lower arm controller 503VN, a W-phase basic controller 502W, a W-phase upper arm controller 503WP, and a W-phase lower arm controller 503WN.

In the following description, U-phase basic controller 502U, V-phase basic controller 502V, and W-phase basic controller 502W may be collectively referred to as basic controller 502. Similarly, U-phase upper arm controller 503UP, U-phase lower arm controller 503UN, V-phase upper arm controller 503VP, V-phase lower arm controller 503VN, W-phase upper arm controller 503WP, and W-phase lower arm controller 503WN may be collectively referred to as arm controller 503.

Figure 4:
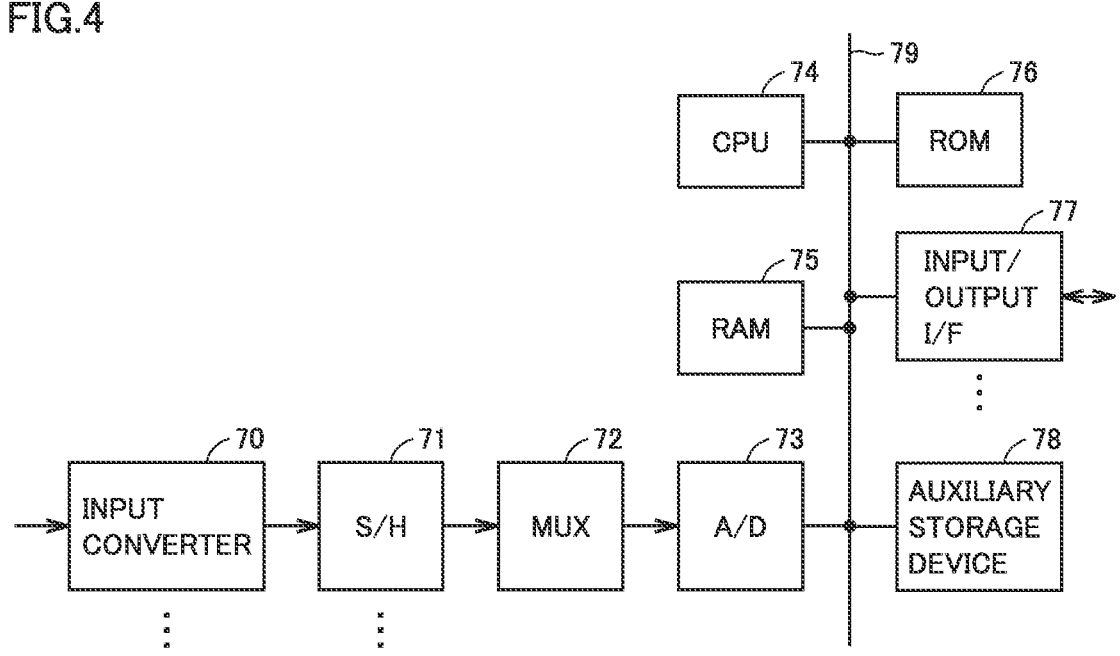
FIG. 4 is a block diagram showing a hardware configuration example of the control device shown in FIG. 1.

FIG. 4 shows a hardware configuration example of the control device. FIG. 4 shows an example in which control device 3 is configured with a computer.

Referring to FIG. 4, control device 3 includes one or more input converters 70, one or more sample hold (S/H) circuits 71, a multiplexer (MUX) 72, and an A/D converter 73. Control device 3 further includes one or more central processing units (CPU) 74, random access memory (RAM) 75, and read only memory (ROM) 76. Control device 3 further includes one or more input/output interfaces 77, an auxiliary storage device 78, and a bus 79 connecting the components above to each other.

Input converter 70 includes an auxiliary transformer (not shown) for each input channel. Each auxiliary transformer converts a detection signal from each electrical quantity detector in FIG. 1 into a signal having a voltage level suitable for subsequent signal processing.

Sample hold circuit 71 is provided for each input converter 70. Sample and hold circuit 71 samples and holds a signal representing the electrical quantity received from the corresponding input converter 70 at a predetermined sampling frequency.

Multiplexer 72 successively selects the signals held by a plurality of sample hold circuits 71. A/D converter 73 converts a signal selected by multiplexer 72 into a digital value. A plurality of A/D converters 73 may be provided to perform A/D conversion of detection signals of a plurality of input channels in parallel.

CPU 74 controls the entire control device 3 and performs computational processing under instructions of a program. RAM 75 as a volatile memory and ROM 76 as a nonvolatile memory are used as a main memory of CPU 74. ROM 76 stores a program and setting values for signal processing. Auxiliary storage device 78 is a nonvolatile memory having a larger capacity than ROM 76 and stores a program and data such as electrical quantity detection values.

Input/output interface 77 is an interface circuit for communication between CPU 74 and an external device.

Unlike the example in FIG. 4, at least a part of control device 3 may be configured using circuitry such as a field programmable gate array (FPGA) and an application specific integrated circuit (ASIC). That is, the function of each functional block illustrated in FIG. 3 may be configured based on the computer illustrated in FIG. 4 or may be at least partially configured with circuitry such as an FPGA and an ASIC. At least a part of the function of each functional block may be configured with an analog circuit.

Figure 5:
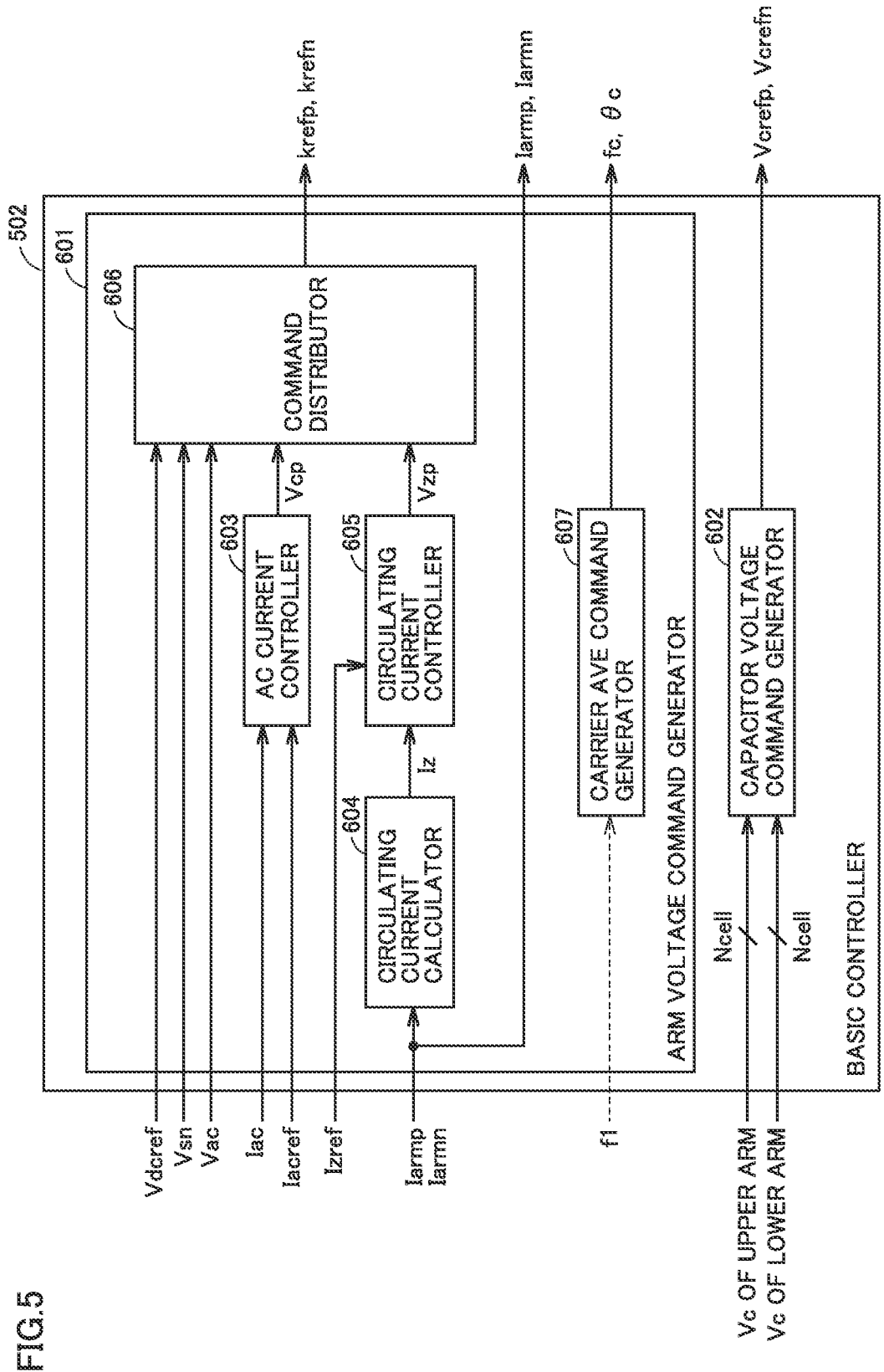
FIG. 5 is a block diagram illustrating a configuration example of a basic controller shown in FIG. 3.

FIG. 5 is a block diagram illustrating a configuration of basic controller 502.

Basic controller 502 includes an arm voltage command generator 601 and a capacitor voltage command generator 602.

Arm voltage command generator 601 calculates an arm voltage command value krefp for upper arm 5 and an arm voltage command value krefn for lower arm 6. In the following description, krefp and krefn are collectively referred to as kref.

Capacitor voltage command generator 602 calculates a capacitor voltage command value Vcrefp for capacitors 32 of Ncell converter cells 7 included in the upper arm. Capacitor voltage command generator 602 calculates a capacitor voltage command value Vcrefn for capacitors 32 of Ncell converter cells 7 included in the lower arm. For example, capacitor voltage command value Vcrefp is determined as an average voltage of capacitors 32 of converter cells 7 in the upper arm. Similarly, capacitor voltage command value Vcrefn is determined as an average voltage of capacitors 32 of converter cells 7 in the lower arm. In the following description, Vcrefp and Vcrefn may be collectively referred to as Vcref.

Arm voltage command generator 601 includes an AC current controller 603, a circulating current calculator 604, a circulating current controller 605, a command distributor 606, and a carrier wave command generator 607.

AC current controller 603 calculates an AC control command value Vcp such that the deviation between the detected AC current Iac and the set AC current command value Iacref becomes zero.

Circulating current calculator 604 calculates circulating current Iz flowing through one leg circuit 4, based on arm current Iarmp of the upper arm and arm current Iarmp of the lower arm. Circulating current is current circulating between a plurality of leg circuits 4. For example, circulating current Iz flowing through one leg circuit 4 can be calculated by the following equations (1) and (2).

$$Idc = (Ipu + Ipv + Ipw + Inu + Inv + Inw)/2 \quad (1)$$

$$Iz = (Iarmp + Iarmn)/2 - Idc/3 \quad (2)$$

Circulating current controller 605 calculates a circulation control command value Vzp to perform control such that circulating current Iz follows the set circulating current command value Izref (for example, Izref=0).

Command distributor 606 receives AC control command value Vcp, circulation control command value Vzp, DC voltage command value Vdcref, neutral point voltage Vsn, and AC voltage Vac. In the present embodiment, command distributor 606 can be operated with neutral point voltage Vsn set to a constant (for example, Vsn=0). DC voltage command value Vdcref may be given by DC output control or may be a constant value.

Command distributor 606 calculates voltage shares output by the upper arm and the lower arm, based on these inputs. Command distributor 606 determines arm voltage command value krefp of the upper arm and arm voltage command value krefn of the lower arm by subtracting a voltage drop due to an inductance component in each of the upper arm and the lower arm from the calculated voltage.

The determined arm voltage command value krefp of the upper arm and arm voltage command value krefn of the lower arm serve as output voltage commands to allow AC current Iac to follow AC current command value Iacref, allow circulating current Iz to follow circulating current command value Izref, allow DC voltage Vdc to follow DC voltage command value Vdcref, and perform feed forward control of AC voltage Vac.

Carrier wave command generator 607 generates a carrier frequency command value fc and a carrier reference phase command value θc that are command values of the frequency and the phase of the carrier wave for use in PWM control in which arm voltage command value krefp and arm voltage command value krefn of the lower arm are modulation command signals. Carrier frequency command value fc is common to converter cells 7, whereas the respective reference phase command values θc(1) to θc(Ncell) are generated for Ncell converter cells that constitute the same arm (upper arm 5 or lower arm 6). In the following, Ncell θc(1) to θc(Ncell) may be collectively simply referred to as θc.

Typically, reference phase command value θc is generated to perform phase shift PWM control. In the phase shift PWM control, the timings of PWM signals to be output to a plurality of (Ncell) converter cells 7 that constitute the same arm (upper arm 5 or lower arm 6) are shifted from each other. For example, Ncell reference phase command values θc(1) to θc(Ncell) are generated for each arm such that for one cycle (2π[rad]) of arm voltage command value kref, the phases are shifted from each other by (2π/Ncell) [rad] in Ncell converter cells in the same arm.

Basic controller 502 outputs arm current Iarmp of the upper arm, arm current Iarmn of the lower arm, arm voltage command value krefp of the upper arm, arm voltage command value krefn of the lower arm, capacitor command voltage value Vcrefp of the upper arm, and capacitor command voltage value Vcrefn of the lower arm. Furthermore, basic controller 502 outputs carrier frequency command value fc and carrier reference phase command value θc generated by carrier wave command generator 607.

Figure 6:
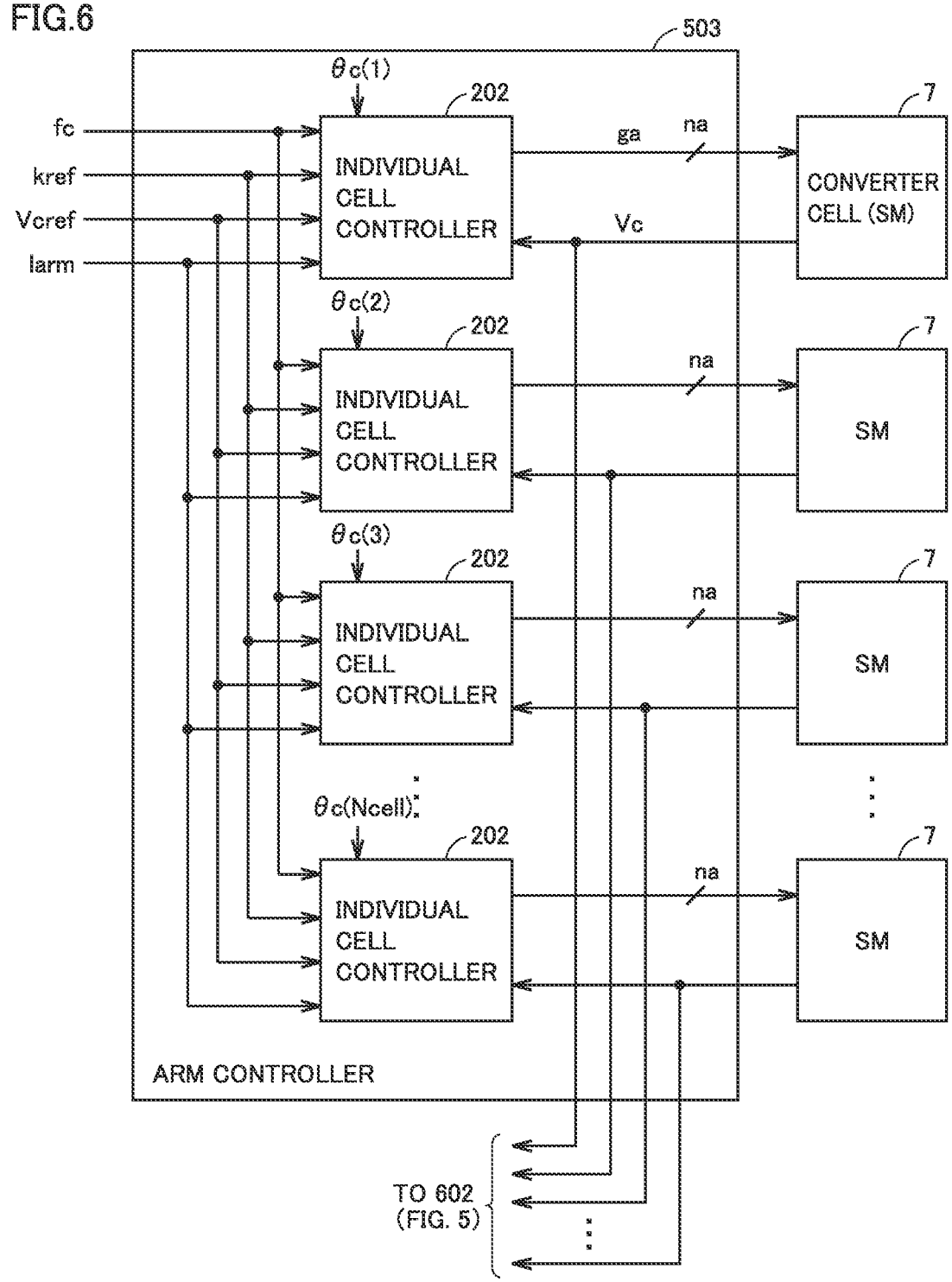
FIG. 6 is a block diagram showing a configuration example of an arm controller shown in FIG. 3.

FIG. 6 is a block diagram illustrating a configuration example of arm controller 503.

Referring to FIG. 6, arm controller 503 includes Ncell individual cell controllers 202.

Individual cell controllers 202 each individually control the corresponding converter cell 7. Individual cell controller 202 receives arm voltage command value kref, arm current Iarm, capacitor command voltage value Vcref, carrier frequency command value fc, and reference phase command value θc (θc(1) to θc(Ncell)), from basic controller 502.

Individual cell controller 202 generates na (where na is a natural number) gate signals ga for the corresponding converter cell 7 and outputs the generated gate signals ga to the corresponding converter cell 7. Gate signals ga are signals for controlling the on/off of switching elements 31p and 31n in converter cell 7 in FIG. 2(a) (na=2). When converter cell 7 has the full bridge configuration in FIG. 2(b), the respective gate signals of switching elements 31p1, 31n1, 31p2, and 31n2 are generated (n=4). On the other hand, the detection value (capacitor voltage Vc) from voltage detector 33 in each converter cell 7 is sent to capacitor voltage command generator 602 shown in FIG. 5.

Figure 7:
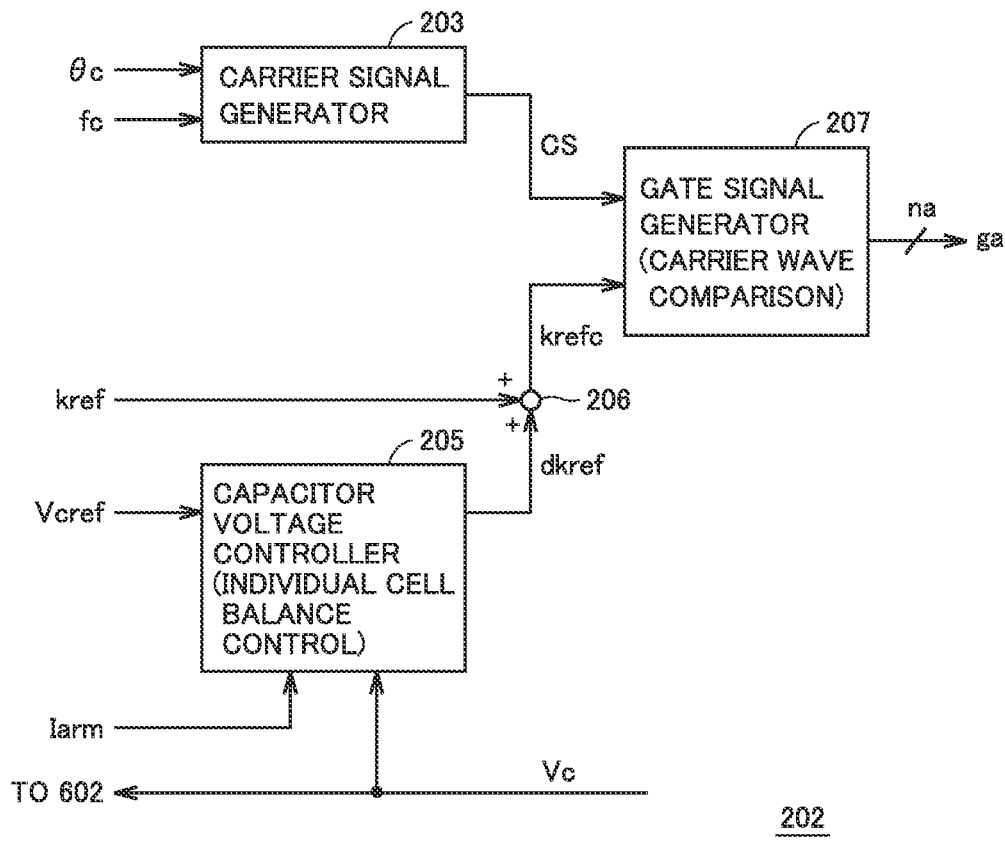
FIG. 7 is a block diagram showing a configuration example of an individual cell controller shown in FIG. 6.

FIG. 7 is a block diagram showing a configuration example of individual cell controller 202 shown in FIG. 6.

Referring to FIG. 7, individual cell controller 202 includes a carrier signal generator 203, a capacitor voltage controller 205, an adder 206, and a gate signal generator 207.

Carrier signal generator 203 generates a carrier signal CS having a frequency and a phase indicated by carrier frequency command value fc and carrier phase command value θc. Carrier signal CS is composed of a periodic signal, such as a triangular wave. Hereinafter, the frequency of carrier signal CS in accordance with carrier frequency command value fc is also referred to as carrier frequency fc.

Capacitor voltage controller 205 performs individual cell balance control for balancing capacitor voltage Vc among converter cells 7 in the same arm. Capacitor voltage controller 205 receives capacitor command voltage value Vcref (Vcrefp or Vcrefn), capacitor voltage Vc of the corresponding converter cell 7, and arm current Iarm of the arm to which the corresponding converter cell 7 belongs. As described above, capacitor command voltage value Vcref corresponds to the average value of capacitor voltages Vc of Ncell converter cells 7 in the same arm.

Capacitor voltage controller 205 performs computation on the deviation of capacitor voltage Vc from capacitor voltage command value Vcref to calculate a control output dkref for capacitor voltage control. Capacitor voltage controller 205 can also be configured with a controller that performs PI control or PID control. Furthermore, control output dkref for charging and discharging capacitor 32 in a direction to eliminate the deviation is calculated by multiplying the computed value by the controller by "+1" or "−1" in accordance with the polarity of arm current Iarm. Alternatively, the computed value above may be multiplied by a reference signal calculated based on the phase of DC current or the phase of AC voltage.

Adder 206 adds arm voltage command value kref from basic controller 502 to control output dkref for individual cell balance control and outputs a cell voltage command value krefc. In this way, control output dkref for individual cell balance control is reflected in capacitor command voltage value Vcref.

Gate signal generator 207 generates na gate signals ga by the carrier wave comparison-type PWM control based on comparison between carrier signal CS from carrier signal generator 203 and cell voltage command value krefc corresponding to a modulation command signal. As described above, the number n of gate signals ga is determined in advance depending on the configuration of converter cells 7.

Figure 8:
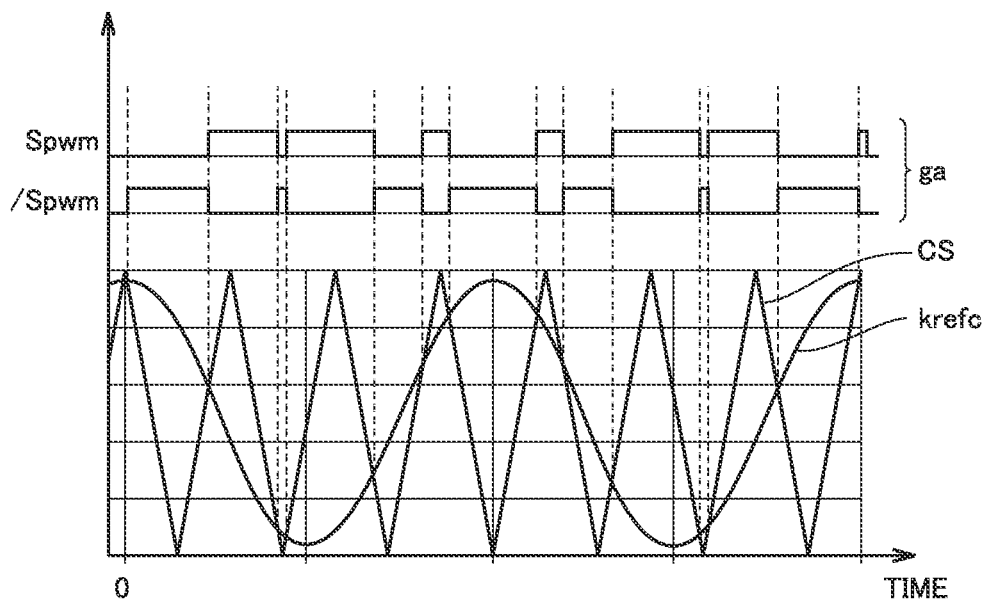
FIG. 8 is a conceptual waveform diagram for explaining PWM modulation by a gate signal generator shown in FIG. 7.

FIG. 8 is a conceptual waveform diagram for explaining PWM modulation control by the gate signal generator shown in FIG. 7.

Referring to FIG. 8, cell voltage command value krefc is compared in voltage with carrier signal CS. When the voltage of cell voltage command value krefc is higher than the voltage of carrier signal CS, a PWM modulation signal Spwm is set to high level (H level). Conversely, when the voltage of carrier signal CS is higher than the voltage of cell voltage command value krefc, PWM modulation signal Spwm is set to low level (L level).

For example, in the H level period of PWM modulation signal Spwm, gate signals ga (na=2) are generated such that switching element 31p is turned ON and switching element 31n is turned OFF in converter cell 7 in FIG. 2(a). Conversely, in the L level period of PWM modulation signal Spwm, gate signals ga (na=2) are generated such that switching element 31n is turned ON and switching element 31p is turned OFF. Actually, these gate signals ga have a dead time in which both are set to L level when the on/off of switching elements 31n and 31p is switched.

Gate signals ga are sent to gate drivers (not shown) of switching elements 31p and 31n in converter cell 7, whereby the on/off of switching elements 31p and 31n in converter cell 7 is controlled. Therefore, it is understood that the frequency of carrier signal CS (carrier frequency) is equal to the switching frequency of switching elements 31n and 31p of each converter cell 7.

In the carrier wave comparison-type PWM control, the number of pulses per cycle of AC component of the modulation command signal (the AC component of cell voltage command value krefc) is equal to the ratio (fc/f1) of the frequency of carrier signal (carrier frequency fc) to the fundamental frequency f1 that is the frequency of the AC component. In FIG. 8, PWM modulation signal Spwm has seven pulse signals in two cycles of fundamental period T1 that is the reciprocal of the fundamental frequency f1, and a waveform with a carrier frequency 3.5 times the fundamental frequency in the same manner as in PTL 1 is shown as a comparative example.

The output voltage of converter cell 7 will be further described in detail.

The output voltage of each converter cell 7 is controlled by gate signal pa generated by individual cell controller 202. For example, converter cell 7 in the half bridge configuration shown in FIG. 2(a) outputs capacitor voltage Vc or zero voltage in accordance with the on/off of switching elements 31n, 31p.

Thus, the output voltage of converter cell 7 includes a harmonic component resulting from the switching, in addition to the frequency component included in cell voltage command value krefc corresponding to "modulation command signal" in each converter cell 7 (for example, fundamental frequency f1 of the fundamental AC component in STATCOM or DC component f0 and fundamental frequency f1 of the fundamental AC component in HVDC). Fundamental frequency f1 corresponds to, for example, a predetermined alternating-current system frequency (50 [Hz] or 60 [Hz]).

In the phase shift PWM control method, since carrier reference phase command values θc of converter cells 7 are distributed evenly in converter cells 7, the phases of the harmonic components resulting from the switching in converter cells 7 are distributed evenly.

As a result, low-order harmonic components are cancelled out in the arm unit, so that higher frequencies of residual harmonics can be achieved. However, when arm current including a harmonic component with the same frequency as that of the harmonic component included in the output voltage of converter cell 7 flows, inflow or outflow of energy of converter cell 7 occurs at this frequency.

Capacitor voltage controller 205 controls active power with the output voltage of each converter cell 7 and arm current Iarm to perform individual cell balance control for balancing capacitor voltage Vc among converter cells 7 in the same arm. When arm current Iarm is sufficiently large, an adjustment margin of the active power can be ensured, and therefore the individual cell balance control can be expected to balance capacitor voltages Vc of converter cells 7. On the other hand, when arm current Iarm is small, the control performance by capacitor voltage controller 205 decreases, and therefore the individual cell balance control may fail to sufficiently suppress the imbalance in capacitor voltage Vc among converter cells 7.

Therefore, in the first embodiment, the imbalance of capacitor voltage Vc is alleviated by appropriate setting of carrier frequency fc. In the following, the reciprocal of the carrier frequency is referred to as carrier period Tc (Tc=1/fc). As described above, the reciprocal of fundamental frequency f1 is fundamental period T1 (T1=1/f1).

FIG. 9 shows the simulation result of the imbalance made in capacitor voltage in the same arm for different carrier frequencies fc. The simulation result is obtained when carrier frequency fc is given by fc/f1=3.5 in FIG. 9(a) and by fc/f1=3.375 in FIG. 9(b) for the same fundamental frequency f1.

In both FIG. 9(a) and FIG. 9(b), the horizontal axis is the time axis, and the vertical axis indicates capacitor voltage Vc. In FIG. 9(a) and FIG. 9(b), the transitions of maximum value Vcmax and minimum value Vcmin of capacitor voltage Vc in the same arm with time are plotted.

In comparison between FIG. 9(a) and FIG. 9(b), the difference between maximum value Vcmax and minimum value Vcmin is smaller in FIG. 9(b) in which carrier frequency fc is lower, suggesting that variation (imbalance) of capacitor voltage Vc in the same arm is small. That is, the variation of capacitor voltage Vc is not smaller with higher carrier frequency fc and is not monotonic. Rather, the voltage variation may be small even when the carrier frequency is low.

The inventors have conducted a wide range of studies and found that the following phenomenon: when the carrier has such a period that an integer multiple of fundamental period T1 matches an integer multiple of carrier period Tc, variation of capacitor voltage Vc is alleviated for increase of carrier frequency fc, and as the period is larger, carrier frequency fc with which variation of capacitor voltage Vc is alleviated is lower.

In the following, among common values between a period that is an integer multiple of fundamental period T1 and a period that is an integer multiple of carrier period Tc, the smallest value is referred to as "complete period". For convenience, the mathematical definition of multiple is extended such that an integer multiple of a positive number (including decimal number) is a multiple, and then "complete period" corresponds to the least common multiple of fundamental period T1 and carrier period Tc. In the following, the number of fundamental periods T1 corresponding to the complete period is referred to as "complete period number".

Here, when the complete period number is N1 (N1 is an integer), N1 times of fundamental period T1 is equal to N2 times of carrier period Tc (N2 is an integer) (T1·N1=Tc·N2). Furthermore, given that the complete period is the least minimum multiple, it is understood that N0 times of fundamental period T1 is a non-integer multiple of carrier period Tc for all integers N0 where N0<N1. That is, fundamental frequency f1 corresponds to "first frequency", fundamental period T1 corresponds to "first period", and integer N1 corresponding to the complete period number corresponds to "first integer". Carrier frequency fc corresponds to "second frequency", carrier period Tc corresponds to "second period", and N2 that satisfies T1·N1=Tc·N2 corresponds to "second integer".

For example, when fc/f1=3.375 (T1=3.375·Tf) shown in FIG. 9(b) is represented in a reduced fraction, 3.375=27/8. Therefore, the relation between T1 and Tc is given by T1=(27/8)·Tc, that is, 8·T1=27·Tc (N1=8, N2=27). Here, it is understood that the complete period number is 8.

As indicated in FIG. 9(b), selecting a complete period number appropriately can suppress variation of capacitor voltage Vc among converter cells 7, even when a high carrier frequency fc is not set.

The output voltage of converter cells 7 (FIG. 2(a)) in a half bridge configuration will now be further analyzed. Cell voltage command value krefc that is a modulation command in PWM control in each converter cell 7 is represented by the following equation (3). In equation (3), kdc represents a DC component and kac represents the amplitude of an AC component. $\omega 1$ is expressed as $\omega_1=2\pi \cdot f1$ using fundamental frequency f1, and ωc is expressed as $\omega_c=2\pi \cdot fc$ using carrier frequency fc.

$$krefc = kdc + kac \cdot \sin(\omega 1 \cdot t + \theta 1) \quad (3)$$

Here, when carrier signal CS is a triangular wave with carrier frequency fc (fc=ωc/(2π)) and with reference phase θc, the output voltage $v_{SM}(t)$ of converter cell 7 can be represented by the following equation (4).

$$v_{SM}(t) = V_c \cdot \left( k_{dc} + k_{ac} \cdot \sin(\omega_1 t + \theta_1) + \right.$$
$$\frac{2}{\pi} \sum_{m=1}^{\infty} \sum_{n=-\infty}^{\infty} \frac{1}{m}\left( \left( \frac{1+(-1)^n}{2}\sin(m\pi k_{dc}) + \frac{1-(-1)^n}{2}\cos(m\pi k_{dc}) \right) J_{|n|}(m\pi k_{ac}) \right)$$
$$\left. \cos(m(\omega_c t + \theta_c) + n(\omega_1 t + \theta_1)) \right) \quad (4)$$

In equation (4), Jn(X) represents Bessel functions of the first kind, and m and n are integers.

In actual operation in an actual device, although cell voltage command value krefc fluctuates, typical components are equivalent to the components represented by equation (4). Gate signal ga sent to converter cell 7 also contains the frequency component shown in equation (4) similarly. Specifically, in converter cell 7 in a half bridge configuration, the waveform of output voltage $v_{SM}(t)$ substantially matches the waveform of gate signal ga. Furthermore, in converter cell 7 in a full bridge configuration, PWM modulation is performed such that the phase of carrier signal CS is reversed 180 degrees between the leg composed of switching elements 31p1, 31n1 and the leg composed of switching elements 31p2, 31n2 as shown in FIG. 2(b), whereby the odd number-order frequency components of carrier frequency fc are cancelled out. As a result, only the even number-order harmonic components are left, and in equation (4), m can be expressed as 2m'.

Equation (4) suggests that in a common case of kdc=0.5, frequency components of an odd multiple of carrier frequency fc±an even multiple of fundamental frequency f1 and an even multiple of carrier frequency fc±an odd multiple of fundamental frequency f1 are generated. However, an MMC-type power converter may be designed with kd≠0.5. In this case, based on equation (4), it is understood that a frequency component is an integer multiple of carrier frequency fc±an integer multiple of fundamental frequency f1.

Referring to equation (4), in a case of kdc=0.49 and kac=0.4, for example, the low-order harmonic components in each carrier frequency fc are as follows.

When carrier frequency fc is 3.5 times of fundamental frequency f1, that is, T1=(7/2)·Tc (2·T1=7·Tc) and the complete period number is 2 (N1=2, N2=7), the output voltage of converter cell 7 includes 4th to 20th low-order integer-multiple harmonic components.

When carrier frequency fc is 3.333 . . . times of fundamental frequency f1, that is, T1(10/3)·Tc (3·T1=10·Tc) and the complete period number is 3 (N1=3, N2=10), the output voltage of converter cell 7 includes 4th, 6th, 7th, 8th, and 10th to 20th low-order integer-multiple harmonic components.

When carrier frequency fc is 3.25 times of fundamental frequency f1, that is, T1(13/4)·Tc (4·T1=13·Tc) and the complete period number is 4 (N1=4, N2=13), the output voltage of converter cell 7 includes 6th, 8th, 9th, 10th, 12th, and 14th to 20th low-order integer-multiple harmonic components.

When carrier frequency fc is 3.4 times of fundamental frequency f1, that is, T1(17/5)·Tc (5·T1=17·Tc) and the complete period number is 5 (N1=5, N2=17), the output voltage of converter cell 7 includes low-order, such as 9th, 11th, 12th, 13th, 15th, 17th, and 19th, integer-multiple harmonic components.

When carrier frequency fc is 3.166 . . . times of fundamental frequency f1, that is, T1(19/6)·Tc (6·T1=19·Tc) and the complete period number is 6 (N1=6, N2=19), the output voltage of converter cell 7 includes low-order, such as 10th, 12th, 13th, 14th, 16th, 18th, and 20th, integer-multiple harmonic components.

When carrier frequency fc is 3.375 times of fundamental frequency f1, that is, T1(27/8)·Tc (8·T1=27·Tc) and the complete period number is 8 (N1=8, N2=27), the output voltage of converter cell 7 includes low-order, such as 16th, 18th, and 20th, integer-multiple harmonic components.

In power systems, it is generally known that certain frequencies that are (6n±1) times (n is a natural number), for example, 5 times, 7 times, 11 times, and 13 times the fundamental frequency f1 include many harmonic components. This is attributable to harmonics output by power electronic circuits such as 12-pulse rectifiers connected to the power systems. In the following, the harmonics of the certain frequencies is referred to as "system-specific harmonic".

As described above, when carrier frequency fc with a complete period number of 2 and 3 is selected, the output voltage of converter cell 7 includes a harmonic component with the same frequency as the system-specific harmonic. This may increase the imbalance of capacitor voltage Vc among converter cells 7.

On the other hand, when carrier frequency fc in which a complete period number is equal to or greater than four is selected, the harmonic component with the same frequency as the system-specific harmonic included in the output voltage of converter cell 7 is smaller on the low order side. As a result, the imbalance of capacitor voltage Vc among converter cells 7 can be suppressed.

In particular, when carrier frequency fc is set such that the complete period number is an even number equal to or greater than four, the frequency at which the harmonic included in the output voltage of converter cell 7 matches the system-specific harmonic tends to be a higher order. Therefore, it is preferable to set carrier frequency fc in this way.

In an actual control device, the frequency is determined mainly by frequency division of a clock signal. Therefore, the multiple (N2/N1) of carrier period Tc with respect to fundamental period T1 of an AC system is set to a multiple of ($\frac{1}{2}^N$) (N is an integer), whereby the multiple can be treated by integer operation by a bit shift of N bits or more. As a result, when a custom large scale integrated circuit (LSI) such as ASIC and FPGA implements the function of PWM control including carrier signal generator 203, the gate scale is suppressed to achieve lower costs.

In combination with the condition in which the complete period number is an even number of four or more as described above, carrier frequency fc is set such that the complete period number is a power of two that is equal to or greater than four, whereby both of suppression of the imbalance of capacitor voltage Vc by suppression of harmonic components and cost reduction of the LSI can be achieved.

Furthermore, it is preferable that the setting of the final carrier frequency through selection of the complete frequency is performed such that the amplitude of the harmonic component with the same frequency as that of the system-specific harmonic is equal to or smaller than a threshold value predetermined based on the system-specific harmonic and the main circuit constant of the converter. For example, the threshold value may be defined as follows.

In general, a system voltage harmonic is 1% of the fundamental component at each order. Thus, when the fundamental percent impedance of inductance between a connection point and the converter is 20%, the harmonic component of current flowing from the power system to the power converter is 1% or smaller at each order. On the other hand, when an output voltage component that can be controlled by individual cell balance control by capacitor voltage controller 205 is 10% of the nominal value and the minimum arm current is 0.1% of the nominal value, the active power controllable by the individual cell balance control is 0.01% of the nominal value. In this case, if the harmonic of the output voltage of a harmonic five times the fundamental frequency f1 is 1% or smaller of the fundamental component, the harmonic power can be set to 0.01% or smaller. Thus, for example, with the threshold set to 1%, the complete period number can be selected, that is, carrier frequency fc can be set such that the amplitude of harmonic of the output voltage of converter cell 7 is equal to or smaller than 1% of the amplitude of the fundamental frequency. Here, the instantaneous value of the amplitude of the harmonic need not always be equal to or smaller than the threshold, and the carrier frequency is set such that the time average value in a certain period equal to or greater than the complete period number is equal to or smaller than the threshold value.

When the phase shift PWM control is employed as described above, reference phase command values θc of carrier signals are set to be shifted from each other by (2π/Ncell) [rad] among a plurality of (Ncell) converter cells 7 included in the same arm (upper arm 5 or lower arm 6). In this case, the complete period is selected in consideration of the number of converter cells 7 in each arm, whereby a carrier frequency can be selected such that ideally variation of capacitor voltage Vc among cells is eliminated.

When the phase shift PWM control is employed, reference phase command value θc(k) of the kth (k is an integer of 1 to Ncell) converter cell 7 among Ncell converter cells 7 in the same arm is expressed by the following equation (5). In equation (5), θ0=θ(1).

$$\theta c(k) = 2\pi/Ncell \cdot (k-1) + \theta 0 \quad (5)$$

According to the above equation (4), for an integer m that satisfies that m·ωc is an integer multiple of ω1, when the condition that m·θc(k)=m·θc(1), that is, m·θc(k)=m·θ0 is satisfied, the phase of the integer-multiple harmonic component can be equalized in all of the converter cells in the arm.

Both sides in equation (5) are multiplied by integer m to yield m·θc(k)=m·(2π/Ncell·(k−1)+θ0). Thus, in order to satisfy the condition above, m is an integer multiple of Ncell.

Here, since T1·N1=Tc·N2, ωc is represented by N2/N1·ω1. Therefore, complete period number N1 is an integer multiple of Ncell in order that m·ωc is an integer multiple of ω1 only when m is an integer multiple of Ncell.

That is, the phases of the integer-multiple harmonics of converter cells 7 are equalized by selecting an integer multiple of Ncell for complete period number N1, so that theoretically, the imbalance of energy due to integer-multiple harmonics is eliminated. As a result, variation of capacitor voltage Vc among the converter cells can be suppressed.

When the phase shift PWM control is employed to converter cell groups each formed with n0 (n0 is an integer that is a divisor of Ncell) converter cells 7 in the same arm, the above equation (5) is transformed into the following equation (6).

$$\theta c(k) = 2\pi/(Ncell/n0) \cdot QINT((k-1)/n0) + \theta 0 \quad (6)$$

In equation (6), QINT(x) is a function indicating the integer part of x. Equation (5) corresponds to equation (6) where n0=1. In equation (6), it is also understood that the same effect as described in equation (5) can be achieved by selecting an integer multiple of (Ncell/n0) for complete period number N1. Also in this case, the complete period number N1 is an integer multiple of Ncell. In this way, low-order integer-multiple harmonic components of the output voltage of converter cells 7 can be suppressed (ideally, to zero) even by selecting the complete period number N1 such that it is an integer multiple of the number of (Ncell) converter cells 7 included in each arm 5, 6.

As described above, in the power conversion device according to the first embodiment, carrier frequency fc is appropriately set through selection of the complete period number, so that low-order integer-multiple harmonic components of the output voltage of converter cells 7 (in particular, low-order components of the system harmonics) can be reduced. As a result, outflow or inflow of energy of converter cells 7 at the frequencies of the harmonics can be suppressed, thereby suppressing the imbalance of capacitor voltage Vc among converter cells 7 in the same arm.

Second Embodiment

In a second embodiment, the carrier wave comparison-type PWM control is performed such that harmonic components (including the harmonic components with the certain frequencies) resulting from the switching of the output voltage is suppressed by changing carrier frequency fc over time.

Figure 10:
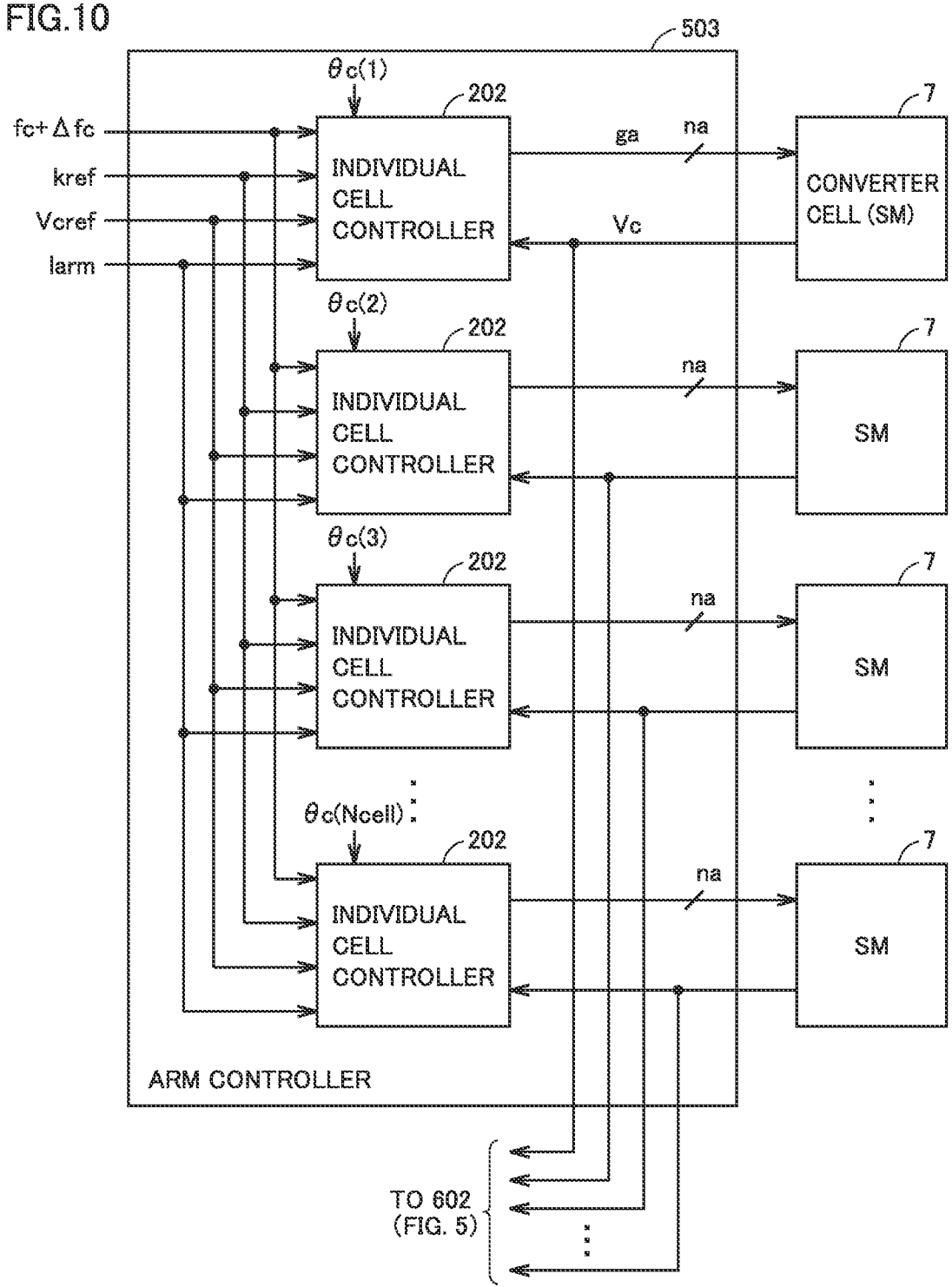
FIG. 10 is a block diagram illustrating a configuration example of the arm controller in the power conversion device according to a second embodiment.

FIG. 10 is a block diagram illustrating a configuration example of the arm controller in the power conversion device according to the second embodiment. The power conversion device according to the second embodiment differs from the power conversion device according to the first embodiment in that it includes an arm controller 503 shown in FIG. 10 instead of arm controller 503 shown in FIG. 5. The configuration of the other part of the power conversion device according to the second embodiment is similar to that of the power conversion device according to the first embodiment.

Referring to FIG. 10, in the second embodiment, fc+Δfc including a fluctuation term Δfc is input as a carrier frequency command value to each individual cell controller 202 of arm controller 503.

As described in the first embodiment, in each converter cell 7, when the frequency of the harmonic component of output voltage $v_{SM}$ (t) matches the frequency of the harmonic component of current flowing through converter cell 7, outflow or inflow of energy of converter cell 7 occurs at this frequency. If the operation of the power conversion device is continued in this state, outflow or inflow of energy continues and ultimately an imbalance of capacitor voltage Vc in the same arm increases.

Here, AC power P generated by AC voltage V with amplitude Vp (V=Vp·cos(m1·t+θv)) and AC current I with amplitude Ip (I=Ip·cos(m2·t+θi)) is expressed by the following equation (7).

$$P = V \cdot I = Vp \cdot \cos(m1 \cdot t + \theta v) Ip \cdot \cos(m2 \cdot t + \theta i) = \quad (7)$$
$$0.5 \cdot Vp \cdot Ip^* \cdot (\cos((m1+m2)t + (\theta v + \theta i)) + \cos((m1-m2)t + (\theta v - \theta i)))$$

In equation (7), m1 and m2 correspond to the angular velocities of AC voltage V and AC current I, where m1>0 and m2>0.

According to equation (7), when m1=m2, that is, when AC voltage V and AC current I have the same frequency, the time average value of AC power P is $\cos(\theta v - \theta i)$. On the other hand, when m1≠m2, P=0 since the time-integral value of trigonometric function (cos) is zero. That is, input/output of energy occurs with the same frequency component between the harmonic of the output voltage of converter cell 7 and the harmonic component of current flowing through converter cell 7. The inflow or the outflow of the energy continues to raise or lower capacitor voltage Vc, thereby increasing the imbalance of capacitor voltage Vc among converter cells 7. The frequency of the harmonic component described above is determined in connection with the switching frequency of switching elements 31p, 31n of each converter cell 7.

Therefore, carrier frequency fc is changed with time during operation of power converter 2 so that the switching frequency of each converter cell 7 is not constant, whereby continuous inflow or outflow of energy at the frequency of the harmonic component described above is suppressed. As a result, the imbalance of capacitor voltage among converter cells 7 can be suppressed.

Figure 11:
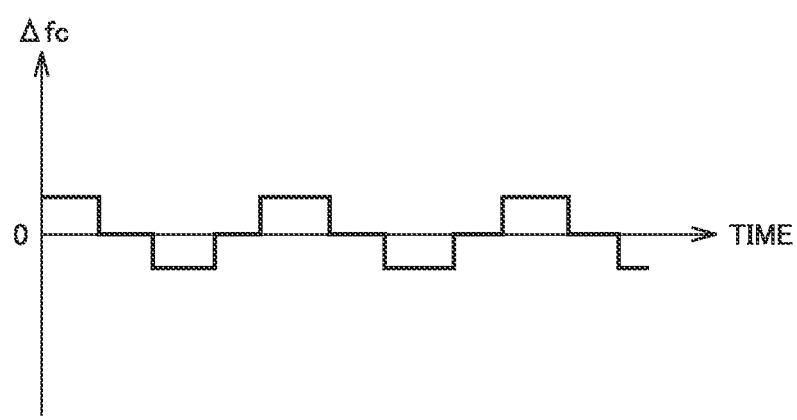
FIG. 11 is a conceptual diagram illustrating a setting example of a fluctuation term of a carrier frequency.

FIG. 11 is a conceptual diagram illustrating a setting example of fluctuation term Δfc of the carrier frequency.

Referring to FIG. 11, Δfc can be set so as to steadily vibrate with time.

In the second embodiment, fc+Δfc is intentionally changed with time to change the switching frequency of switching elements 31p, 31n of each converter cell 7. As a result, the frequency of the harmonic component of output voltage $v_{SM}$(t) changes (not constant) with time, so that the imbalance of capacitor voltage Vc is suppressed. That is, since the effect above can be achieved by applying Δfc to prevent carrier frequency (fc+Δfc) from being constant, the setting of Δfc is not limited to the example in FIG. 11 and can be made as desired.

In this way, in the second embodiment, the frequency of the carrier signal (carrier frequency) in the carrier wave comparison-type PWM control is fluctuated during operation of power converter 2, so that the imbalance of capacitor voltage among converter cells 7 can be suppressed in the same manner as in the first embodiment.

In the second embodiment, fc is assumed as the center value of the carrier frequency with fluctuation term Δfc removed. However, even when the setting of fc in the second embodiment does not involve selection of a complete period number described in the first embodiment, the effect of suppressing the imbalance of capacitor voltage Vc can be achieved by applying Δfc.

Third Embodiment

As expressed in the above equation (7), when AC voltage V and AC current I match in frequency (m1=m2), the time average value of AC power P is $0.5 \cdot Vp \cdot Ip \cdot \cos(\theta v - \theta i)$. Therefore, even when m1=m2 in equation (7), the imbalance of capacitor voltage Vc resulting from AC power P can be suppressed by controlling the phase of AC voltage V or AC current I such that the time average value of $\cos(\theta v - \theta i)$ is zero.

Figure 12:
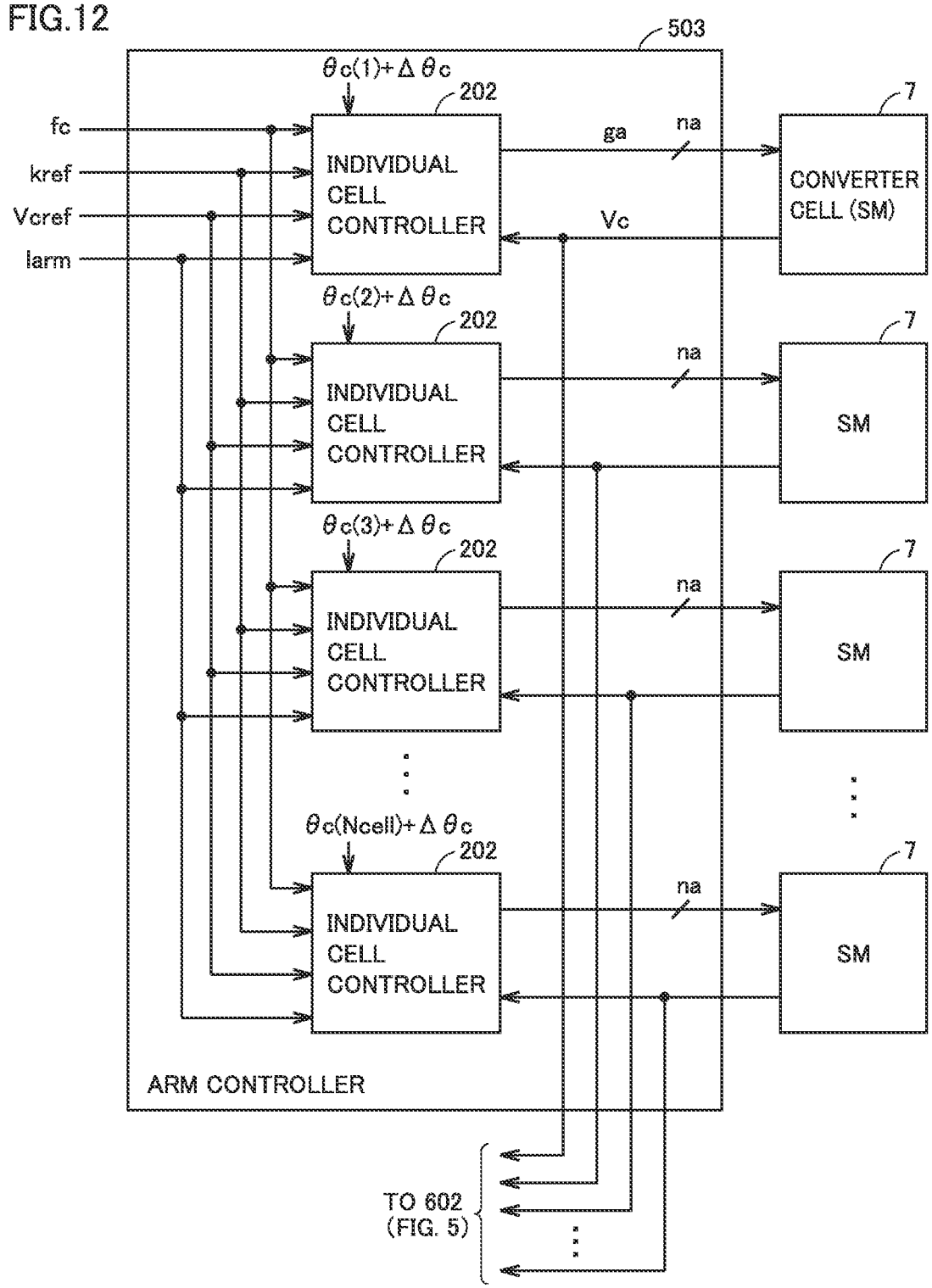
FIG. 12 is a block diagram illustrating a configuration example of the arm controller in the power conversion device according to a third embodiment.

FIG. 12 is a block diagram illustrating a configuration example of the arm controller in the power conversion device according to a third embodiment. The power conversion device according to the third embodiment differs from the power conversion device according to the first embodiment in that it includes an arm controller 503 shown in FIG. 12 instead of arm controller 503 shown in FIG. 5. The configuration of the other part of the power conversion device according to the third embodiment is similar to that of the power conversion device according to the first embodiment.

Referring to FIG. 12, in the third embodiment, θc+Δθc including a fluctuation term Δθc is input as a reference phase command value to each individual cell controller 202 of arm controller 503. Fluctuation term Δθ can be set so as to steadily vibrate with time in the same manner as fluctuation term Δfc (FIG. 11) in the second embodiment. Thus, (θv−θi) in the term $\cos(\theta v - \theta i)$ is fluctuated with time, so that the time average value of $\cos(\theta v - \theta i)$ becomes zero. As a result, continuous inflow or outflow of energy of converter cell 7 (capacitor 32) at the frequency of the harmonic component described above due to continuous generation of AC power P in equation (7) can be suppressed.

As a result, in the third embodiment, the reference phase of the carrier signal in the carrier wave comparison-type PWM control is fluctuated during operation of power converter 3, so that the imbalance of capacitor voltage among converter cells 7 can be suppressed in the same manner as in the second embodiment.

In the third embodiment, even when the setting of carrier frequency fc does not involve selection of a complete period number described in the first embodiment, the effect of suppressing the imbalance of capacitor voltage Vc can also be achieved by applying Δθc in the same manner as in the second embodiment.

The second and third embodiments may be combined to perform the carrier wave comparison-type PWM control by generating a carrier signal such that both of the carrier frequency and the reference phase fluctuate during operation of power converter 2.

In the second and third embodiments, the harmonic component associated with the switching frequency is suppressed over the entire frequency range to achieve the effect of suppressing the harmonic component of the system-specific harmonic (in particular, low order side) explained in the first embodiment, whereby the imbalance of capacitor voltage Vc among converter cell 7 is suppressed.

Even in the second and third embodiments, the carrier frequency (fc+Δfc) or the reference phase (θc+Δθc) can be set such that the ratio of harmonic component with a certain frequency, for example, the same frequency as the system-specific harmonic, with respect to the fundamental component is equal to or smaller than a threshold value (for example, 1%) that is predetermined based on the system-specific harmonic and the main circuit constant of the converter.

The control of changing carrier frequency fc and reference phase θc over time according to the second and third embodiments may be executed and stopped based on voltage history of capacitor voltage Vc.

Figure 13:
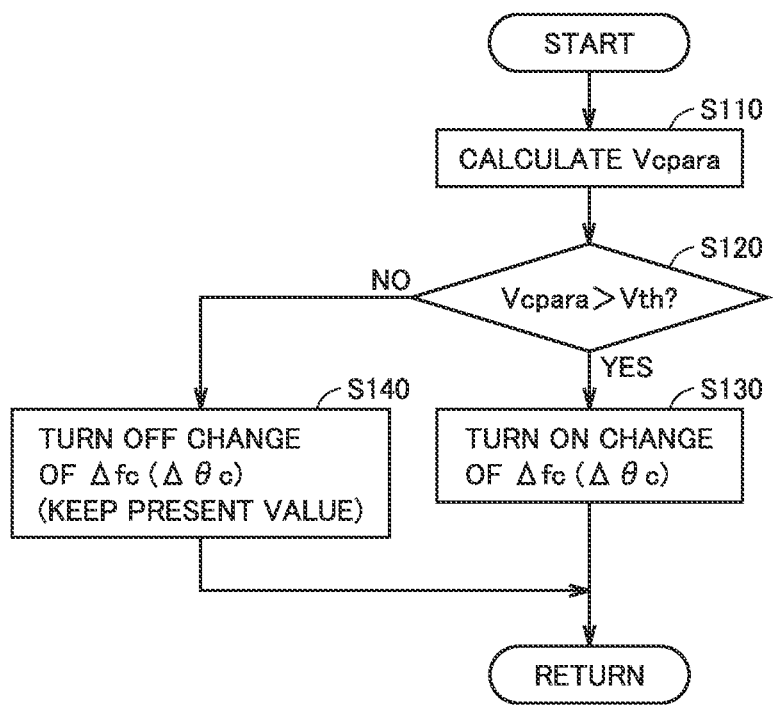
FIG. 13 is a flowchart illustrating a control process for executing and stopping the control according to the second and third embodiments.

FIG. 13 is a flowchart illustrating a control process for executing and stopping the control according to the second and third embodiments. The control process shown in FIG. 13 can be repeatedly performed by control device 3 (more specifically, carrier wave command generator 607 in FIG. 5).

Referring to FIG. 13, control device 3 calculates a parameter value Vcpara indicating variation history of capacitor voltage Vc at step (which hereinafter may be simply referred to as S) 110. For example, parameter value Vcpara can be calculated in accordance with the moving average for a certain time of the difference (Vcmax-Vcmin) between maximum value Vcmax and minimum value Vcmin of capacitor voltage Vc in the same arm as described above. However, parameter value Vcpara may be calculated by a definition different from this.

At S120, control device 30 compares parameter value Vcpara calculated at S110 with a predetermined reference value Vth. Then, when Vcpara>Vth, that is the fluctuation of capacitor voltage Vc is large (the determination at S120 is YES), at S130, control device 30 sets at least one of Δfc and Δθc as described in the second and third embodiments, for each individual cell controller 202 corresponding to converter cell 7 included in the arm.

On the other hand, when Vcpara≤Vth, that is, the fluctuation of capacitor voltage Vc is equal to or smaller than the reference value (the determination at S120 is NO), at S140, control device 30 turns off the change of Δfc and Δθc for each individual cell controller 202 corresponding to converter cell 7 included in the arm. That is, Δfc and Δθc are kept at present values, and frequency fc and reference phase θc of the carrier signal are also fixed.

Thus, the control of changing at least one of the frequency and the reference phase of the carrier signal over time can be performed in a limited manner to address a large voltage variation, depending on the history value of variation (fluctuation) of capacitor voltage Vc. In order to prevent frequent switching between execution and stop of the control, reference value Vth may be set to different values between during execution and during stop of the control.

Fourth Embodiment

In the first to third embodiments, the control of suppressing the imbalance of capacitor voltage Vc under the carrier wave comparison-type PWM control has been described. However, the PWM control of the MMC power converter is not limited to the carrier wave comparison type. In a fourth embodiment, the control of suppressing the imbalance of capacitor voltage Vc in the PWM control by the certain low-order harmonic cancellation-type pulse pattern method described in PTL 2 will be described.

In the fourth embodiment, the PWM control by the certain low-order harmonic cancellation-type pulse pattern method described in PTL 2 is applied to the on/off control of the switching elements in each converter cell 7 to remove low-order harmonics included in the output voltage of each converter cell 7.

Figure 14:
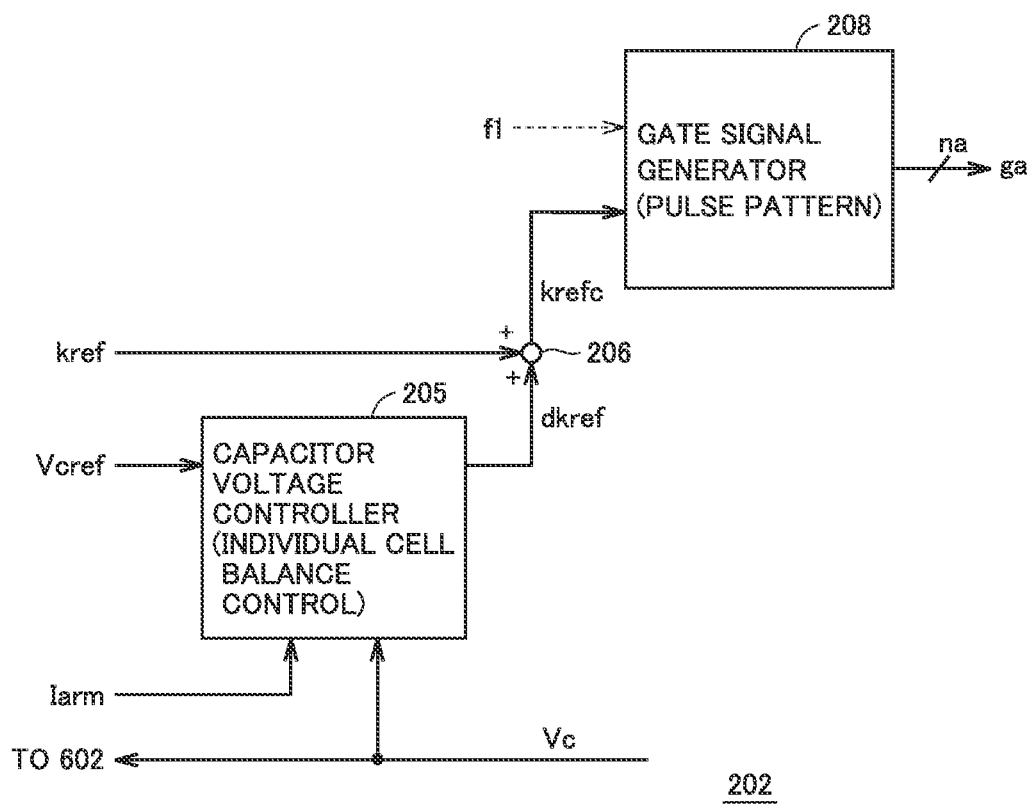
FIG. 14 is a block diagram illustrating a configuration example of the individual cell controller in the power conversion device according to a fourth embodiment.

FIG. 14 is a block diagram illustrating a configuration example of the individual cell controller in the power conversion device according to the fourth embodiment.

The power conversion device according to the fourth embodiment differs from the power conversion device according to the first embodiment in that it includes an individual cell controller 202 shown in FIG. 14 instead of individual cell controller 202 shown in FIG. 7. The configuration of the other part of the power conversion device according to the fourth embodiment is similar to that of the power conversion device according to the first embodiment.

Referring to FIG. 14, in the fourth embodiment, individual cell controller 202 does not have carrier signal generator 203 (FIG. 7) and has a gate signal generator 208 instead of the carrier wave comparison-type gate signal generator 207 (FIG. 7). Gate signal generator 208 receives cell voltage command value krefc similar to that of FIG. 7 output from adder 206.

Gate signal generator 208 generates a pulse pattern signal Sppt from cell voltage command value krefc by the PWM control by the certain low-order harmonic cancellation-type pulse pattern method. Specifically, pulse pattern signal Sppt for each pattern period is generated based on cell voltage command value krefc that is a modulation command. Gate signal ga is generated in accordance with the pulse pattern signal.

The pattern period Tps of pulse pattern signal Sppt and the number of pulses Nps in each pattern period are predetermined. Since the on/off of switching elements 31p, 31n in converter cell 7 is switched at each of the rising edge and the falling edge of one pulse, the on/off of the switching elements occur 2·Npt times in each pattern period. As described in PTL 2, the harmonic component of a certain order can be set to zero by the on/off timing, that is, the arrangement of phases (electrical angle) in a pattern period.

For example, when the number of pulses in fundamental period T1 is 3.5, a period twice the fundamental period T1 is set as pattern period Tps, and pulse pattern signal Sppt is generated such that the number of pulses Nps in each pattern period Tps is 7, in the same manner as when the complete period number is 2 in the first embodiment.

Figure 15:
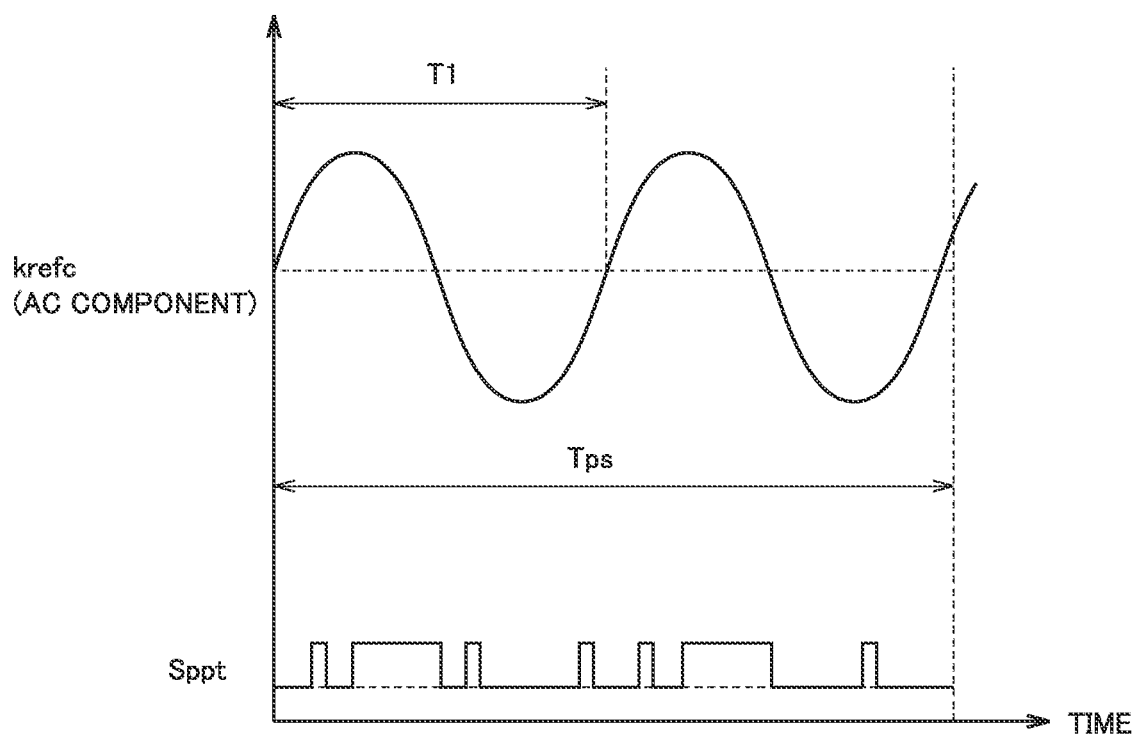
FIG. 15 is a conceptual diagram illustrating an exemplary pulse pattern signal by PWM control in the power conversion device according to the fourth embodiment.

FIG. 15 shows an example of the pulse pattern signal. FIG. 15 shows the pulse pattern signal when the number of pluses Nps of fundamental period T1 is 3.5 as described above.

Referring to FIG. 15, the period (pattern period) Tps of the pulse pattern signal is twice the fundamental period T1, and seven pulses are generated in each pattern period Tps (Np=7).

When the number of pulses is 3.5, the output voltage $v_{SM}$(t) of the converter cell includes a harmonic component (n/2) times the fundamental frequency (n=1 and an integer of n>3), in addition to a DC component and a fundamental component.

As described above, since switching elements 31p, 31n are turned on/off at both edges of each pulse, the degree of freedom of the PWM control by the arrangement of pulses (the setting of position of each edge (electrical angle)) is 2×7=14. For example, when three degrees of freedom are used for the control of the DC component of cell voltage command value krefc that is a modulation command and the amplitude and the phase of the fundamental component (AC component), the remaining degree of freedom is 11.

For example, among these, eight degrees of freedom may be used to control the amplitude and the phase of 5th harmonic, the amplitude and the phase of 7th harmonic, the amplitude and the phase of 11th harmonic, and the amplitude and the phase of 13th harmonic, which typically remain in a power system, to remove the harmonic components. Specifically, as described in PTL 2, the positions (electrical angle) of the edges of a pulse can be arranged such that 5th, 7th, 11th, and 13th harmonic components calculated by Fourier series expansion of output voltage $v_{SM}$(t) are controlled. That is, in the certain low-order harmonic cancellation-type pulse pattern method, the frequency component to be suppressed can be system-specific harmonic (specifically, low order side) explained in the first embodiment. The remaining three degrees of freedom can be used for suppression of higher-order harmonic components and control of the third harmonic component actively superimposed for ensuring the percent modulation margin.

In general, the energy of harmonic components is greater on the lower order side. It is therefore preferable to suppress at least 5th and 7th harmonic components among the 5th, 7th, 11th, and 13th harmonic components. Thus, while any given number of pluses can be provided in pattern period Tps, preferably, at least four pulses are provided in terms of limiting the number of pulses, and a pulse pattern signal is generated such that the amplitude and the phase of 5th and 7th harmonics are controlled using four phases (that is, four degrees of freedom) among a plurality of edges of the pulses.

As a result, in the fourth embodiment, the PWM control by the certain low-order harmonic cancellation-type pulse pattern method is applied to remove the low-order harmonics included in the output voltage of each converter cell 7, whereby the imbalance of capacitor voltage among converter cells 7 caused by inflow or outflow of energy with the harmonic components can be suppressed.

In the first to third embodiments in which the carrier wave comparison-type PWM control is performed, in FIG. 5 to FIG. 7, FIG. 10, and FIG. 12, the command value (fc or fc+Δfc) of the carrier frequency and the command value (θc or θc+Δθc) of the carrier reference phase are applied from the upper level (carrier wave command generator 607 in basic controller 502) to individual cell controller 202. However, each individual cell controller 202 may directly generate carrier signal CS with a frequency of fc or fc+Δt and a phase of θc or θc+Δθc without depending on a command from the upper level.

For example, carrier signal generator 203 of each individual cell controller 202 may generate carrier signal CS having a carrier frequency fc predetermined by selection of a compete frequency or a frequency (fc+Δfc) with a fluctuation term, using a counter operating based on a clock signal. Alternatively, carrier signal generator 203 of each individual cell controller 202 may generate carrier signal CS having a phase of θc or θc+Δθc using an index indicating the ordinal position in the same arm of each converter cell 7 and a preset common reference phase that is common in the arms. In this case, the control process of Δfc and Δθc for turning on/off the control of changing the frequency or the phase of carrier signal CS over time as shown in FIG. 13 is also performed in carrier signal generator 203 of each individual cell controller 202.

In FIG. 1, power converter 2 has a double star configuration and is mainly used for an AC/DC converter for HVDC transmission. However, the control of the power converter explained in the foregoing embodiments is applicable to power converters of any other configurations.

Figure 16:
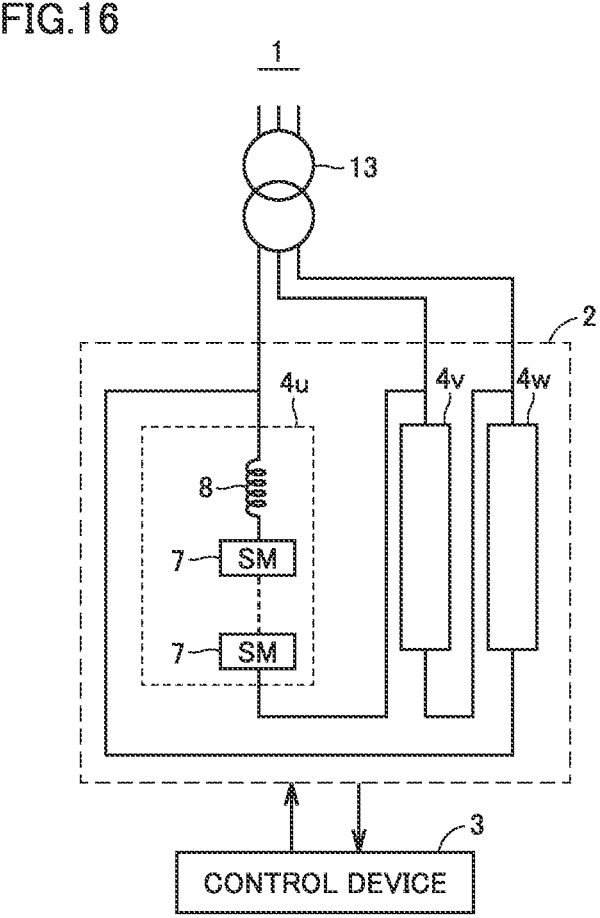
FIG. 16 is a circuit diagram illustrating a first modification of the configuration of the power conversion device.

For example, as shown in FIG. 16, the control described in the present embodiments can be applied to power converter 2 having a single delta configuration.

Figure 17:
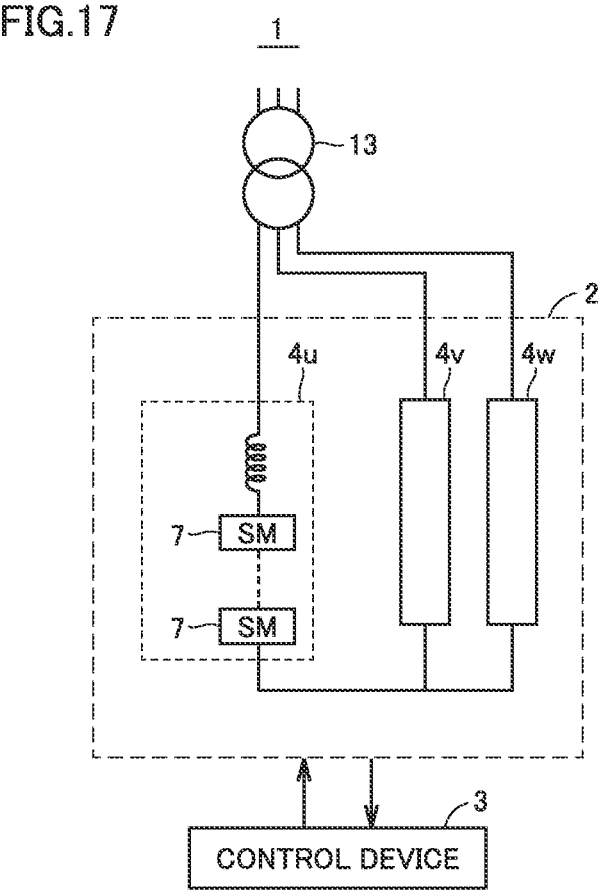
FIG. 17 is a circuit diagram illustrating a second modification of the configuration of the power conversion device.

Alternatively, as shown in FIG. 17, the control described in the present embodiments can be applied to power converter 2 having a single star configuration. It is known that the configurations of power converter 2 shown in FIG. 16 and FIG. 17 are applied mainly for static var compensators.

Embodiments disclosed here should be understood as being illustrative rather than being limitative in all respects. The scope of the present disclosure is shown not in the foregoing description but in the claims, and it is intended that all modifications that come within the meaning and range of equivalence to the claims are embraced here.

REFERENCE SIGNS LIST

1 power conversion device, 2 power converter, 3 control device, 4, 4u, 4v, 4w leg circuit, 5, 6 arm, 7 converter cell, 8A, 8B reactor, 9A, 9B arm current detector, 10 AC voltage detector, 11A, 11B, 17 DC voltage detector, 12 AC circuit, 13 transformer, 14 DC circuit, 16 AC current detector, 31n1, 31n2, 31n, 31p1, 31p2, 31p switching element, 32 capacitor (power storage element), 33 voltage detector, 70 input converter, 71 sample hold circuit, 72 multiplexer, 73 A/D converter, 75 RAM, 76 ROM, 77 input/output interface, 78 auxiliary storage device, 79 bus, 202 individual cell controller, 203 carrier signal generator, 205 capacitor voltage controller, 206 adder, 207, 208 gate signal generator, 501 switching controller, 502, 502U, 502V, 502W basic controller, 503, 503UN, 503VN, 503WN arm controller, 503UP, 503VP, 503WP phase upper arm controller, 601 arm voltage command generator, 602 capacitor voltage command generator, 603 AC current controller, 604 circulating current calculator, 605 circulating current controller, 606 command distributor, 607 carrier wave command generator, CS carrier signal, Iacref AC current command value, Iarm, Iarmn, Iarmp, Inu, Inv, Inw, Ipu arm current, Idc DC current, Inu lower arm current, Iz circulating current, Izref circulating current command value, Nn low potential-side DC terminal, Np high potential-side DC terminal, Nu, Nv, Nw AC input terminal, P1, P2 input/output terminal, Spwm PWM modulation signal, T1 fundamental period, Tc carrier period, Tps pattern period, Vc capacitor voltage, Vcmax capacitor voltage maximum value, Vcmin capacitor voltage minimum value, Vcref, Vcrefn, Vcrefp capacitor command voltage value, Vdcref DC voltage command value, Vsn neutral point voltage, Vth reference value, dkref control output (individual cell balance control), f1 fundamental frequency, fc carrier frequency command value (carrier frequency), ga, pa gate signal, kref, krefn, krefp arm voltage command value, krefc cell voltage command value.

The invention claimed is:

1. A power conversion device comprising:
   a power converter including at least one arm having a plurality of converter cells cascaded to each; and
   a control device to control the power converter,
   each of the converter cells including
      a pair of input/output terminals,
      a plurality of switching elements, and
      a power storage element electrically connected to the input/output terminals through the switching elements,
   the control device including
      an individual cell controller to generate a control signal for controlling on and off of the switching elements of each of the converter cells,
   wherein the individual cell controller generates the control signal by pulse width modulation control based on a modulation command signal including an AC component having a predetermined first frequency and corresponding to a command value of an output voltage between the input/output terminals, in each converter cell, such that a harmonic component included in the output voltage and having a predetermined frequency that is an integer multiple of the first frequency is suppressed.

2. The power conversion device according to claim 1, wherein
   the individual cell controller includes
      a carrier signal generator to generate, as a carrier signal, a periodic signal having a second frequency higher than the first frequency and a reference phase, and
      a signal generator to generate the control signal based on comparison between the carrier signal and the modulation command signal,
   the second frequency is determined in accordance with a first integer and a second integer selected such that an integer multiple by the first integer of a first period that is a reciprocal of the first frequency is equal to an integer multiple by the second integer of a second period that is a reciprocal of the second frequency and that integer multiples of the first period by all integers smaller than the first integer are non-integer multiples of the second period.

3. The power conversion device according to claim 2, wherein
the first integer is further selected such that a ratio of an amplitude of the harmonic component having the predetermined frequency to an amplitude of a component having the first frequency of the output voltage is equal to or smaller than a predetermined threshold value.

4. The power conversion device according to claim 2, wherein the first integer is selected such that a ratio of a time average value of the ratio of the amplitude of the harmonic component having the predetermined frequency to the amplitude of an component having the first frequency in a predetermined period is equal to or smaller than a predetermined threshold value.

5. The power conversion device according to claim 2, wherein
the first integer is further selected to be an integer multiple of the number of the converter cells of each arm.

6. The power conversion device according to claim 2, wherein
the first integer is selected to be an even number equal to or greater than four.

7. The power conversion device according to claim 6, wherein the second frequency is set by selecting a power of two that is equal to or greater than four as the first integer.

8. The power conversion device according to claim 1, wherein
the individual cell controller includes
a carrier signal generator to generate, as a carrier signal, a periodic signal having a second frequency higher than the first frequency and a reference phase, and
a signal generator to generate the control signal based on comparison between the carrier signal and the modulation command signal, and
the carrier signal generator generates the carrier signal such that at least one of the second frequency and the reference phase fluctuates with time during operation of the power converter.

9. The power conversion device according to claim 8, wherein the carrier signal generator generates the carrier signal such that the second frequency fluctuates with time during operation of the power converter.

10. The power conversion device according to claim 8, wherein the carrier signal generator generates the carrier signal such that the reference phase fluctuates with time during operation of the power converter.

11. The power conversion device according to claim 8, wherein the control device performs control such that the carrier signal generator generates the carrier signal such that at least one of the second frequency and the reference phase fluctuates, in accordance with a history value of voltage variation of the power storage element, during operation of the power converter.

12. The power conversion device according to claim 8, wherein the carrier signal generator generates the carrier signal with at least one of the second frequency and the reference phase fluctuated, such that a time average value of a ratio of an amplitude of the harmonic component having the predetermined frequency to an amplitude of a component having the first frequency of the output voltage is equal to or smaller than a predetermined threshold value.

13. The power conversion device according to claim 8, wherein the carrier signal generator generates the carrier signal with at least one of the second frequency and the reference phase fluctuated, such that a time average value in a certain period of a ratio of an amplitude of the harmonic component having the predetermined frequency to an amplitude of a component having the first frequency of the output voltage is equal to or smaller than a predetermined threshold value.

14. The power conversion device according to claim 1, wherein
the modulation command signal is indicated by a sum of a DC component and an AC component having the first frequency,
the individual cell controller includes a signal generator to generate the control signal in accordance with a pulse pattern signal in which a plurality of pulses are provided in each of predetermined pattern periods,
on and off of the switching elements of each converter cell is switched at each of both edges of each of the pulses,
the pattern period is an integer multiple of a first period that is a reciprocal of the first frequency,
some of the edges of the pulses are set to phases in the pattern period for controlling the DC component and an amplitude and a phase of the AC component, and
others of the edges are set to phases in the pattern period for suppressing a harmonic component having the predetermined frequency.

15. The power conversion device according to claim 14, wherein
the pulse pattern signal is generated such that the pattern period is twice the first period and to have at least four of the pulses in each pattern period, and
the phases of four edges among the edges are set to suppress harmonic components having frequencies five times and seven times the first frequency.

16. The power conversion device according to claim 1, wherein the harmonic components suppressed at least include a frequency five times, a frequency seven times, a frequency 11 times, and a frequency 13 times the first frequency.

17. The power conversion device according to claim 1, wherein
each of the converter cells further includes
a voltage detector to detect a voltage of the power storage element, the control device further includes
a voltage command generator to set, as a voltage command value for the arm, an average value of voltage detection values by the voltage detector in the converter cells for each arm,
the individual cell controller includes
a voltage controller to calculate a control output based on a deviation between the voltage detection value in each converter cell and the voltage command value, and
the modulation command signal reflecting the control output from the voltage controller is generated.

18. The power conversion device according to claim 1, wherein the power converter is connected between a DC circuit and an AC circuit to mutually convert DC power and AC power.

* * * * *